US011132856B2

(12) United States Patent
Carstens et al.

(10) Patent No.: US 11,132,856 B2
(45) Date of Patent: Sep. 28, 2021

(54) SELECTION OF ACCESS CONTROL APPARATUSES ON AN ACCESS AUTHORIZATION PROVING APPARATUS ON THE BASIS OF INFORMATION OF A SHIPMENT

(71) Applicants: Christian Carstens, Windhagen (DE); Christoph Dautz, Bonn (DE); Jochen Jansen, Bonn (DE); Ramin Benz, Bonn (DE); Stanislav Bulygin, Darmstadt (DE); Marcus Lippert, Pfungstadt (DE)

(72) Inventors: Christian Carstens, Windhagen (DE); Christoph Dautz, Bonn (DE); Jochen Jansen, Bonn (DE); Ramin Benz, Bonn (DE); Stanislav Bulygin, Darmstadt (DE); Marcus Lippert, Pfungstadt (DE)

(73) Assignee: Deutsche Post AG, Bonn (DE)

( * ) Notice: Subject to any disclaimer, the term of this patent is extended or adjusted under 35 U.S.C. 154(b) by 1268 days.

(21) Appl. No.: 15/167,761

(22) Filed: May 27, 2016

(65) Prior Publication Data
US 2016/0275741 A1 Sep. 22, 2016

Related U.S. Application Data

(63) Continuation of application No. PCT/EP2014/076573, filed on Dec. 4, 2014.

(30) Foreign Application Priority Data

Dec. 5, 2013 (DE) ...................... 10 2013 113 554.4
Apr. 11, 2014 (DE) ...................... 10 2014 105 247.1

(51) Int. Cl.
*G07C 9/00* (2020.01)
*H04W 56/00* (2009.01)
(Continued)

(52) U.S. Cl.
CPC ....... *G07C 9/00896* (2013.01); *A47G 29/141* (2013.01); *A47G 29/16* (2013.01);
(Continued)

(58) Field of Classification Search
CPC .. G07C 9/00896; G07C 9/00; G07C 9/00111; G07C 9/00119; G07C 9/00182;
(Continued)

(56) References Cited

U.S. PATENT DOCUMENTS

| 4,233,661 A | 11/1980 | Bolton et al. |
| 6,895,507 B1 | 5/2005 | Teppler |

(Continued)

FOREIGN PATENT DOCUMENTS

| CN | 102067183 A | 5/2011 |
| CN | 202929669 U | 5/2013 |

(Continued)

OTHER PUBLICATIONS

Home Delivery vs Parcel Lockers: an economic and environmental assessment, Maria Giuffrida, 2012, p. 1-2 (Year: 2012).*

(Continued)

*Primary Examiner* — Kevin H Flynn
*Assistant Examiner* — Ibrahim N El-Bathy
(74) *Attorney, Agent, or Firm* — Reinhart Boerner Van Deuren P.C.

(57) ABSTRACT

Provided is a method, performed by an access authorisation verification apparatus, involving the steps of: obtaining a piece of information from a transmission; identifying a transmission data record using the piece of information obtained from the transmission, wherein the transmission data record comprises address information associated with the transmission; determining an access control apparatus on the basis of a comparison of the address information of the transmission data record with respective address informa- (Continued)

tion that is associated with the access control apparatuses and stored on the access authorisation verification apparatus; allowing selection and/or confirmation of an access control apparatus for the determined access control apparatus by a user of the access authorisation verification apparatus; and communicating access authorization information to the access control apparatus in order to gain access to a room associated with the access control apparatus, so that the transmission can be placed into or removed from the room.

40 Claims, 8 Drawing Sheets

(51) Int. Cl.
| | |
|---|---|
| H04L 29/06 | (2006.01) |
| G06F 1/12 | (2006.01) |
| H04L 9/08 | (2006.01) |
| G06F 1/24 | (2006.01) |
| H04W 4/80 | (2018.01) |
| A47G 29/14 | (2006.01) |
| A47G 29/16 | (2006.01) |
| G07F 17/12 | (2006.01) |
| G06Q 10/08 | (2012.01) |
| H04L 9/32 | (2006.01) |
| H04L 9/00 | (2006.01) |
| E05B 43/00 | (2006.01) |
| E05B 65/00 | (2006.01) |
| G07C 9/28 | (2020.01) |
| G07C 9/29 | (2020.01) |
| H04W 12/082 | (2021.01) |
| E05B 47/00 | (2006.01) |
| E05B 65/52 | (2006.01) |
| E05C 9/08 | (2006.01) |
| E05C 9/18 | (2006.01) |
| H04L 9/14 | (2006.01) |
| H04L 9/30 | (2006.01) |
| G06F 1/10 | (2006.01) |
| G06F 21/31 | (2013.01) |
| H04L 7/00 | (2006.01) |
| G06F 1/04 | (2006.01) |
| H04L 9/06 | (2006.01) |
| G05B 19/00 | (2006.01) |

(52) U.S. Cl.
CPC ........ *E05B 43/005* (2013.01); *E05B 47/0001* (2013.01); *E05B 65/0003* (2013.01); *E05B 65/0078* (2013.01); *E05B 65/5246* (2013.01); *E05C 9/08* (2013.01); *E05C 9/18* (2013.01); *G06F 1/10* (2013.01); *G06F 1/12* (2013.01); *G06F 1/24* (2013.01); *G06F 21/31* (2013.01); *G06Q 10/083* (2013.01); *G06Q 10/0836* (2013.01); *G07C 9/00* (2013.01); *G07C 9/00182* (2013.01); *G07C 9/00309* (2013.01); *G07C 9/00817* (2013.01); *G07C 9/00904* (2013.01); *G07C 9/00912* (2013.01); *G07C 9/28* (2020.01); *G07C 9/29* (2020.01); *G07F 17/12* (2013.01); *H04L 7/0012* (2013.01); *H04L 9/00* (2013.01); *H04L 9/08* (2013.01); *H04L 9/0819* (2013.01); *H04L 9/14* (2013.01); *H04L 9/302* (2013.01); *H04L 9/3242* (2013.01); *H04L 9/3247* (2013.01); *H04L 9/3249* (2013.01); *H04L 63/045* (2013.01); *H04L 63/062* (2013.01); *H04L 63/10* (2013.01); *H04W 4/80* (2018.02); *H04W 12/082* (2021.01); *H04W 56/001* (2013.01); *A47G 2029/149* (2013.01); *G05B 19/00* (2013.01); *G06F 1/04* (2013.01); *G07C 2009/0092* (2013.01); *G07C 2009/00373* (2013.01); *G07C 2009/00412* (2013.01); *G07C 2009/00468* (2013.01); *G07C 2009/00642* (2013.01); *G07C 2209/08* (2013.01); *G07C 2209/63* (2013.01); *G07C 2209/64* (2013.01); *H04L 9/0637* (2013.01); *H04L 9/088* (2013.01); *H04L 2209/805* (2013.01)

(58) Field of Classification Search
CPC ............ G07C 9/00309; G07C 9/00817; G07C 9/00904; G07C 9/00912; H04W 4/80; H04W 12/08; H04W 56/001; A47G 29/141; A47G 29/16; E05B 43/005; E05B 47/0001; E05B 65/0003; E05B 65/0078; E05B 65/5246; E05C 9/08; E05C 9/18; G06F 1/10; G06F 1/12; G06F 1/24; G06F 21/31; G06Q 10/083; G06Q 10/0836; G07F 17/12; H04L 7/0012; H04L 9/00; H04L 9/08; H04L 9/0819; H04L 9/14; H04L 9/302; H04L 9/3242; H04L 9/3247; H04L 9/3249; H04L 63/045; H04L 63/062; H04L 63/10
See application file for complete search history.

(56) References Cited

U.S. PATENT DOCUMENTS

| | | | |
|---|---|---|---|
| 2002/0180580 A1* | 12/2002 | Gotfried | .............. A47G 29/141 340/5.2 |
| 2003/0079129 A1 | 4/2003 | Lindsay | |
| 2006/0238334 A1* | 10/2006 | Mangan | ................. G06Q 10/08 340/539.13 |
| 2008/0004967 A1* | 1/2008 | Gillen | .................... G06Q 10/08 705/24 |
| 2008/0004995 A1 | 1/2008 | Klingenberg et al. | |
| 2013/0082099 A1* | 4/2013 | Furrer | ...................... G01N 1/28 235/375 |
| 2015/0112887 A1* | 4/2015 | Camp | ................ G06Q 10/0836 705/339 |

FOREIGN PATENT DOCUMENTS

| | | |
|---|---|---|
| DE | 20 2011 101 134 U1 | 9/2011 |
| DE | 20 2012 012 010 U1 | 3/2013 |
| EP | 1 024 239 A1 | 8/2000 |
| EP | 2595341 A1 | 5/2013 |
| FR | 2836805 B1 | 7/2004 |
| GB | 2 352 314 A | 1/2001 |

OTHER PUBLICATIONS

JH. Song et al., Request for Comments (RFC) Document 4493, The AES-CMAC Algorithm, Jun. 2006, 20 pages, Network Working Group, The Internet Society, WA.
H. Krawczyk et al., Request for Comments (RFC) Document 2104, HMAC: Keyed-Hashing for Message Authentication, Feb. 1997, 11 pages, Network Working Group, NY.

* cited by examiner

Fig.5c

| Name, first name | Address |
|---|---|
| Erdnuss Erika | Alnokweg 24 |
| Erdnuss Ernst | Alnokweg 24 |
| Erdnuss Emelie | Alnokweg 24 |
| Haselnuss Heinz | Alnokweg 26 |

Delivery 15:33
Parcel box: 1234500006
Address: Alnokweg 24
Back

Fig.5d

| Name, first name | Address |
|---|---|
| Erdnuss Erika | Alnokweg 24 |
| Erdnuss Ernst | Alnokweg 24 |
| Erdnuss Emelie | Alnokweg 24 |
| Haselnuss Heinz | Alnokweg 26 |

Delivery 15:33
Parcel box: 1234500006
Address: Alnokweg 24
Back | Open

SELECTION OF ACCESS CONTROL APPARATUSES ON AN ACCESS AUTHORIZATION PROVING APPARATUS ON THE BASIS OF INFORMATION OF A SHIPMENT

CROSS-REFERENCE TO RELATED PATENT APPLICATIONS

This patent application is a continuation of PCT/EP2014/076573, filed Dec. 4, 2014, which claims priority to German Application No. 10 2013 113 554.4, filed Dec. 5, 2013, and German Application No. 10 2014 105 247.1, filed Apr. 11, 2014, the entire teachings and disclosure of which are incorporated herein by reference thereto.

FIELD

Exemplary embodiments of the invention relate to an access authorization proving apparatus on which a plurality of access control apparatuses and pieces of access authorization information respectively associated therewith are selectable, an apparatus for providing pieces of information to such an access authorization proving apparatus, a system comprising these components, and also the methods performed by said components and their realization as computer programs.

BACKGROUND

Access authorization proving apparatuses are used in access control systems to prove that a person or a device is authorized to obtain access at an access control apparatus. Such access control systems find application in many different ways, for example for controlling access of persons to rooms of a building, as is the case for example in hotels, office complexes or laboratories, to events, or else in abstract form to functions, resources or services, for example computer functions or resources or serve services.

A specific application of access control systems is also constituted by controlling access of persons to openings of containers, such as e.g. lockboxes or goods delivery containers, in particular parcel boxes. Parcel boxes enable a new form of delivery/retrieval of parcels for persons who want to receive or send parcels even when they are away from their residence, or in the vicinity of their residence. For this purpose, parcel boxes are usually installed in front of the residence of the parcel box user—in a manner similar to a mailbox, but with a larger capacity—and parcels are then delivered by the deliverer by insertion into the parcel box or are retrieved by withdrawal from the parcel box. It is also conceivable for a parcel box installation for a plurality of parties of a multi-dwelling unit to be set up in front of or in a multi-dwelling unit. In order to prevent misuse and theft, the parcel box must have a lock. Both the deliverer and the parcel box user must then be equipped with physical or logical keys in order to be able to use the parcel box. The logical keys then contain for example access authorization information indicating what parcel box is permitted to be opened in what time interval and to what extent (only one door, a plurality of doors, etc.).

SUMMARY OF SOME EXEMPLARY EMBODIMENTS OF THE INVENTION

If respective access authorization information is required for opening each parcel box, deliverers must have the respective pieces of access authorization information for all parcel boxes at least in their delivery area. Pieces of access authorization information can be stored for example electronically on a device of the deliverer, in particular a handheld scanner. However, the problem then arises for the deliverer that, in order to open a parcel box, the correct piece of access authorization information has to be selected from a plurality of pieces of access authorization information, which is time-consuming and thus delays the delivery process.

The present invention has therefore set itself the object of overcoming this problem.

A first aspect of the invention discloses a method, performed by an access authorization proving apparatus, the method comprising the following:

obtaining information of a shipment, identifying a shipment data set from a plurality of shipment data sets stored on the access authorization proving apparatus using the obtained information of the shipment, wherein the shipment data set comprises address information associated with the shipment, determining one or more access control apparatus(es) from a plurality of access control apparatuses on the basis of a result of a comparison of the address information of the shipment data set with respective address information associated with the access control apparatuses and stored on the access authorization proving apparatus and/or with address information respectively associated with one or more user(s) of the respective access control apparatus and stored on the access authorization proving apparatus, enabling a selection and/or a confirmation of an access control apparatus from the one or more determined access control apparatus(es) by a user of the access authorization proving apparatus, and communicating access authorization information associated with the access control apparatus to the access control apparatus in order to obtain access to a compartment assigned to the access control apparatus, such that the shipment can be inserted into the compartment or removed therefrom.

The first aspect of the invention furthermore discloses the use of an access authorization proving apparatus configured to perform and/or control the method in accordance with the first aspect of the invention or comprising respective means for performing and/or controlling the steps of the method in accordance with the first aspect of the invention, the use comprising:

handling the access authorization proving apparatus, such that the information of the shipment is obtained by the access authorization proving apparatus, selecting and/or confirming an access control apparatus from the one or more access control apparatus(es) determined by the access authorization proving apparatus, and inserting the shipment into the compartment assigned to the access control apparatus or removing the shipment from the compartment after the access authorization proving apparatus has obtained access to the compartment by communicating the access authorization information to the access control apparatus.

A second aspect of the invention discloses a method comprising the following:

providing the following pieces of information:

a plurality of shipment data sets, wherein each of the shipment data sets comprises respective address information of a respective shipment, respective pieces of address information associated with access control apparatuses from a plurality of access control apparatuses and/or respective pieces of address information associated with one or more respective user(s) of the plurality of access control apparatuses, and respective pieces of access authorization information associated with the access control apparatuses from the plurality of access control apparatuses.

The second aspect of the invention furthermore discloses a system comprising the following:

one or more apparatuses configured to perform and/or control the method in accordance with the second aspect of the invention or comprising means for performing and/or controlling the steps of the method in accordance with the second aspect of the invention.

Each of these aspects of the invention further discloses in each case:

a computer program, comprising program instructions that cause a processor to perform and/or control the method in accordance with the respective aspect of the invention when the computer program runs on the processor. In this specification, a processor should be understood to mean, inter alia, control units, microprocessors, microcontrol units such as microcontrollers, digital signal processors (DSP), application-specific integrated circuits (ASICs) or Field Programmable Gate Arrays (FPGAs). Here either all the steps of the method can be controlled, or all the steps of the method can be performed, or one or more steps can be controlled and one or more steps can be performed. The computer program can be distributable for example via a network such as the Internet, a telephone or mobile radio network and/or a local network. The computer program can be at least partly software and/or firmware of a processor. It can equally be implemented at least partly as hardware. The computer program can be stored for example on a computer-readable storage medium, e.g. a magnetic, electrical, electromagnetic, optical and/or other type of storage medium. The storage medium can be for example part of the processor, for example a (nonvolatile or volatile) program memory of the processor or a part thereof.

an apparatus, configured to perform and/or control the method in accordance with the respective aspect of the invention or comprising respective means for performing the steps of the method in accordance with the respective aspect of the invention. Here either all of the steps of the method can be controlled, or all the steps of the method can be performed, or one or more steps can be controlled and one or more steps can be performed. One or more of the means can also be implemented and/or controlled by the same unit. By way of example, one or more of the means can be formed by one or more processors.

an apparatus comprising at least one processor and at least one memory that includes program code, wherein the memory and the program code are configured to cause the apparatus having the at least one processor to perform and/or control at least the method in accordance with the respective aspect of the invention. Here either all the steps of the method can be controlled, or all the steps of the method can be performed, or one or more steps can be controlled and one or more steps can be performed.

A third aspect of the invention discloses a system in accordance with the second aspect of the invention that further comprises the following:

an access authorization proving apparatus in accordance with the first aspect of the invention.

The first, second and third aspects of the invention find application for example in a system for delivering and/or retrieving shipments.

These three aspects of the present invention have inter alia the—in part exemplary—properties described below.

The access authorization proving apparatus can be for example a portable electronic device. The portable electronic device can be assigned to a deliverer, for example, and is then referred to hereinafter as "deliverer device". The portable electronic device can be in particular a handheld scanner.

The portable electronic device has for example a graphical user interface and a functionality for wirelessly capturing information of shipments (e.g. parcels or letters), for example by optically scanning shipment labels and/or capturing pieces of information of shipments via radio (e.g. RFID) or magnetic fields (e.g. NFC), for example if the parcel has an RFID tag or NFC tag. The portable electronic device can have for example the capability of communicating via a cellular mobile radio network, but this can also not be the case. The portable electronic device can have for example the capability of communicating via WLAN and/or via a cellular mobile radio system (in particular via GRPS). The portable electronic device can have for example the capability of communicating via Bluetooth and/or NFC, for example also by means of corresponding retrofitting. If the access authorization proving apparatus is configured to communicate access authorization information to the access control apparatus by means of Bluetooth, it is advantageous for the Medium Access Control (MAC) address of the access control apparatus to be known to the access authorization proving apparatus, since the Bluetooth communication can then be started without the need for time-consuming Bluetooth pairing. The MAC address of the access control apparatus is communicated to the access authorization proving apparatus for example together with the access authorization information. One example of a portable electronic device, in particular a deliverer device, is a handheld scanner, e.g. the LXE Tecton MX7 from Honeywell.

An access control apparatus comprises for example one or more processors that control one or more locking devices, for example an electronically controllable lock, and can thus bring about opening and/or closing of the lock, for example. The lock can be equipped with a latch function, for example, such that the access control apparatus has to control for example only an opening of the lock (for example by means of at least temporarily transferring the latch to an open position, for example by means of an electric motor), while the lock is closed manually by a user by a procedure in which said user uses the latch function and, for example, by pressing a door shut, displaces the latch from the shut position to the open position and, after the process of pressing shut has ended, the latch automatically returns to the shut position again, for example by means of spring preloading. The access control apparatus can also comprise the locking devices and further components. An access control apparatus can be part of an apparatus for which it provides access control, for example of a receptacle apparatus, or can itself be an apparatus for whose compartment/compartments it provides access control (for example a parcel box). The access control apparatus can be battery-operated, for example, and have no, more particularly continuous, power connection, for example. The access control apparatus can be configured for example in such a way that in operation it is configured exclusively for communication with access authorization proving apparatuses, and for example is not configured for communication with the access authorization generation apparatus. The access control apparatus has for example no connection to a mobile radio network, a local area network (LAN), a wireless local area network (WLAN) or the Internet, that is to say that it thus constitutes for example an "offline" access control apparatus. The wireless communication of the access control apparatus can be configured for example for communication with apparatuses in relatively close proximity to the access control apparatus (for example less than 100 m). The wireless communication of the access control apparatus can be limited for example to communication by means of Radio Frequency Identification (RFID) and/or Near Field Communication (NFC) and/or Bluetooth (e.g. Bluetooth Version 2.1 and/or 4.0). RFID and NFC are specified for example in accordance with ISO standards 18000, 11784/11785 and ISO/IEC standard 14443-A and 15693. The Bluetooth specifications are available at www[dot]Bluetooth[dot]org. Nevertheless, the access control apparatus can have for example a Universal Serial Bus (USB) interface, via which the access control apparatus can be maintained, for example.

An access control apparatus performs access control, for example, in order to decide whether, on the basis of access authorization information obtained by an access authorization proving apparatus, access (for example to compartments of buildings or apparatuses) is permitted to be granted. Examples of access to compartments of apparatuses are access to receptacle compartments of receptacle apparatuses, such as e.g. lockboxes, lockers, refrigerators, goods delivery containers, mailboxes, parcel boxes, combined mail and parcel boxes, vehicles (e.g. luggage compartments) or key boxes (in order to reach keys situated therein), which for example are in each case closed with doors and secured by locking devices. The compartment or the compartments can also be formed in the access control apparatus. It is also conceivable that, in a combined process, firstly the access to a compartment of a building (e.g. a stairwell or vestibule of a multi-dwelling unit) is controlled, followed by control of the access to an apparatus situated therein, for example a parcel box or a parcel box installation comprising a plurality of parcel boxes or comprising a plurality of parcel and/or letter compartments for different groups of recipients. For example, the same access authorization information or respective pieces of access authorization information (e.g. one piece of access authorization information for a door to the compartment and another for a door of a parcel box or of a parcel box installation) stored at least on the same access authorization proving apparatus can be used for both access processes.

If it is decided that access is permitted to be granted, for example access is granted, for example by a control signal being transmitted, for example to a lock, in order for example to unlock and/or open a door to a compartment or a plurality of compartments in order to enable access to the one or the plurality of compartments. Access can be granted to different contents; by way of example, if a plurality of receptacle compartments are present, only access to specific receptacle compartments or groups of receptacle compartments can be granted.

The access authorization information (which is also referred to as access authorization in this specification) should be understood for example as information which is evaluated in the context of a check performed by the access control apparatus to establish whether access is permitted to be granted to an entity. The check of the access authorization information need not be the sole check in the context of the access control; by way of example, further necessary conditions can be required in order that access is permitted to be granted. Examples of access authorization information are for example a code or key which is communicated to the access control apparatus and is compared with a code or key stored in the access control apparatus, in order, upon correspondence, to decide that access is permitted to be granted. The code or key can be additionally secured against being spied out, for example by encryption. The code or key can be used permanently, for example, or can be changed at regular or irregular intervals. By way of example, a new code can be generated according to a predefined specification according to temporal predeterminations (e.g. every day) or each time a code is used. This can be implemented both in the access control apparatus and in the access authorization proving apparatus, hence both have respectively corresponding pairs of codes or keys, or in the access control apparatus and in a unit from which the access authorization proving apparatus obtains the code or key.

The access authorization information is respectively associated with an access control apparatus. It can be for example specific (that is to say individual) to the respective access control apparatus, such that the pieces of access authorization information for different access control apparatuses differ from one another. If the access authorization proving apparatus comprises for example respective pieces of access authorization information for obtaining access to a plurality of access control apparatuses, then from these pieces of access authorization information, for obtaining access to a specific one of the access control apparatuses, the access authorization information associated with said access control apparatus must be selected and then communicated to the access control apparatus.

One example of access authorization information is described in EP 1 024 239 A1, in which the access authorization information is designed as an access token tij which defines access rights aij, for example in the form: "Grant user ui access to lock lj until 1/2/2001". The access rights are then transmitted to a lock and counterchecked. In other words, a check is made for example to establish whether the user who presents the access token is the user ui, whether the access token is valid for the lock lj and whether the period of validity "up to 1/2/2001" of the lock has not yet expired. In addition, the access rights aij can be provided with a Message Authentication Code (MAC), for example an HMAC according to Request for Comments (RFC) Document 2104. The MAC is based on a key sj known both at a unit which generates the access token and in the lock. The access token tij then comprises the HMAC and the access rights aij, for example in a concatenated form. The lock can then confirm the authenticity of the access token on the basis of the received MAC, the received access rights aij and the key sj and can then check the access rights aij. Alternatively, the access rights in accordance with EP 1 024 239 A1 can also be defined as follows: "Grant access to lock $l_j$ to the user who knows k until 1/1/2001". The user must then have both the access token $t_{ij}$ and knowledge of k (a key) in order to obtain access to the lock and both (for example in encrypted form) are made available to the user by a unit which generates the token. In both cases, the access authorization information, that is to say the access token, is specific to the respective lock $l_j$.

The access authorization information associated with an access control apparatus (for example by virtue of the fact that it authorizes for access at said access control apparatus) is communicated from the access authorization proving apparatus to the access control apparatus. This can be done for example via wireless communication, for example via communication by means of RFID, NFC or Bluetooth. The aim of the communication is to obtain access to a compartment (e.g. a receptacle compartment of a parcel box) assigned to the access control apparatus in order that a shipment can be inserted into the compartment or be removed therefrom.

Beforehand, however, this access authorization information must be selected from a plurality of pieces of access authorization information which are stored on the access authorization proving apparatus and which are respectively associated with different access control apparatuses from a plurality of access control apparatuses. In order to facilitate this selection for a user of the access authorization proving apparatus (e.g. a deliverer) and thus to accelerate the process of access to access control apparatuses, in particular automatically determining one or more access control apparatus (es) possible for a present shipment is performed in the access authorization proving apparatus. After this determining, the user of the access authorization proving apparatus must for example only confirm a determined access control apparatus or select (and then for example also confirm as well) one access control apparatus from a reduced set of one or more access control apparatuses. The access authorization information associated with said confirmed/selected access control apparatus is then communicated to said access control apparatus in order to obtain access for the user.

Determining the one or more access control apparatuses is based on a comparison of the address information of a shipment present with the respective pieces of address information of a plurality of access control apparatuses and/or the respective pieces of address information of the respective user(s) of the plurality of access control apparatuses, for example of all access control apparatuses and/or the users thereof for which respectively associated address information is stored on the access authorization proving apparatus.

This address information respectively associated with an access control apparatus is for example address information which contains an address at which the access control apparatus and/or an apparatus (e.g. a parcel box) controlled by the access control apparatus are/is positioned, or is representative of said address, for example in the form of a code. Said code can comprise for example the so-called routing information comprising for example a code for the zip code (e.g. the zip code itself), a code for the street and a code for the house number (e.g. the house number itself). The coding of these codes here can correspond for example to the coding of the address information in the routing code (explained in even greater detail below) which is used for shipments. The address can comprise for example a zip code, a street and/or a house number; a country identifier and/or further pieces of information such as a residence number or a floor number can optionally be contained as well. The address information can for example also contain both the address and a code for the address. The address and/or the code can be used for the comparison with other address information. The address respectively associated with an access control apparatus is contained for example in a respective access control apparatus data set which for example can also contain the respective access authorization information for the respective access control apparatus and also further pieces of information, such as e.g. an identifier of the access control apparatus or of an apparatus (e.g. a parcel box) assigned thereto or of one of its components.

The address information associated with a user of an access control apparatus comprises for example the address of the place of residence or place of business of the user and/or information representative thereof (e.g. a code, in particular a piece of routing information already explained above). This address information can be contained for example in a user data set which can be associated with an access control apparatus, for example by virtue of the fact that it has an identifier of the access control apparatus (or of an apparatus controlled thereby, such as e.g. a parcel box). Taking into consideration the address information of the user(s) of the access control apparatuses takes account of the fact that a plurality of users for example from the same neighborhood can share an access control apparatus, e.g. a parcel box, and then the address of a user need not necessarily correspond to the address of the access control apparatus.

In a similar manner, a shipment (e.g. a parcel, a small package or a letter) is associated with a piece of address information which comprises an address or an information representative of said address to which the shipment is intended to be delivered or from which said shipment is intended to be retrieved. The address information can comprise for example a routing code (for example in addition to the actual address) or consist thereof. A routing code comprises for example 14 digits, of which digits 1-5 contain the zip code, digits 6-8 contain a street code, digits 9-11 contain the house number, digits 12-13 contain a product code and digit 14 contains a check digit. The address information associated with the shipment is contained in a shipment data set which is specific to the shipment, for example. The shipment data set can contain for example further pieces of information, in particular the name (e.g. first name and surname) of the recipient or a sender of the shipment. The shipment data set can furthermore contain an in particular unique identifier for the shipment, for example an identification code, which can for example also be used for shipment tracking purposes. The identification code can comprise for example 12 digits and code the following information: digits 1-2: the outgoing freight postal center, digits 3-5: the customer identifier, digits 6-11: a posting number, digit 12: a check digit. However, different definitions of the identification code are also conceivable.

By comparing the address information associated with the shipment with the pieces of address information respectively associated with the access control apparatuses from the plurality of access control apparatuses and/or with the pieces of address information respectively associated with the respective user(s) of the plurality of access control apparatuses, a set of one or more access control apparatuses is determined, wherein for example a predefined degree of correspondence is required in order that an access control apparatus is determined as being associated with the set. By way of example, said set contains all the access control apparatuses whose associated address information (and/or the address information of the user(s) thereof) correspond to the address information associated with the shipment at least vis-a-vis the zip code and the street, or whose associated address information (and/or the address information of the user(s) thereof) correspond completely (e.g. vis-a-vis zip code, street and house number) to the address information associated with the shipment. As already mentioned, here either directly on the basis of the address information associated with an access control apparatus, an access control apparatus can be deduced, or indirectly on the basis of the address information associated with a user, an access control apparatus associated with said user can be deduced. Comparing can be performed on the basis of the addresses contained in the respective pieces of address information and/or the codes contained therein. In other words, it is possible to compare with one another codes, for example, or addresses, or codes and addresses. Here the comparison on the basis of codes can be more efficient, for example.

The comparison of the address information associated with the shipment with the respective pieces of address information associated with the access control apparatus (and/or with the respective address information associated with the respective user(s) of the access control apparatus) presupposes that the address information of the shipment is known. To that end, the access authorization proving apparatus stores a plurality of shipment data sets which are respectively assigned to a shipment and comprise the address information of the shipment. This involves for example shipment data sets for all shipments which a user of the access authorization proving apparatus must deliver and/or collect in a predefined time interval (for example on one day). The shipment data set relevant to a shipment present is identified at the access authorization proving apparatus on the basis of pieces of information of a shipment. Said pieces of information may have been captured in particular by wireless capture by means of the access authorization proving apparatus from the shipment, for example optically from a shipment label, for example by scanning in a barcode (e.g. a 1D or 2D barcode). Alternatively, capture via radio and/or via electric or magnetic fields is also possible if the shipment is equipped with corresponding information elements (e.g. RFID or NFC tags). As a further alternative, the information of the shipment can also be input by the user of the access authorization proving apparatus via a keyboard (for example a hardware or software keyboard) of the access authorization proving apparatus and thereby be obtained by the access authorization proving apparatus. The information of the shipment (for example an identifier or a code for the shipment, in particular an identification code) thus obtained at the access authorization proving apparatus is then used for identifying the correct shipment data set, for example by comparison with a corresponding information (e.g. an identifier or a code, in particular an identification code) of the shipment that is contained in the respective data sets. If the correct shipment data set was identified, the address information contained therein and associated with the shipment is also present as a basis of the comparison with the pieces of address information of the access control apparatuses and/or the address information of the user(s) thereof.

This procedure therefore considerably reduces the scope of the selection of access control apparatuses from which a user of the access control apparatus must select one access control apparatus in order to be able to communicate access authorization information associated with the access control apparatus to the access control apparatus and to obtain access thereto. In the ideal case, the user merely has to ensure that the access authorization proving apparatus obtains the information of the shipment, e.g. by scanning in, and then merely has to confirm an indicated access control apparatus or to select (and for example also confirm as well) one access control apparatus from a few access control apparatuses. The confirmation and/or selection can then directly lead to the communication of the access authorization information to the access control apparatus. Alternatively, the access authorization proving apparatus can also be put in a mode for readiness for communicating the access authorization information when the access authorization information is communicated only when a communication module of the access control apparatus has been woken up, for example by a proximity sensor of the access control apparatus. The access authorization proving apparatus then has to be brought for example into the vicinity of the sensor of the access authorization proving apparatus in order to wake up the communication module thereof, and, as soon as the communication module has woken up, the communication of the access authorization information to the access control apparatus can take place.

A prerequisite for the reduction according to the invention of the number of access control apparatuses from which a user must select if said user wants to obtain access to a specific access control apparatus for introducing or collecting a shipment is that the presence of corresponding shipment data sets and access control apparatus data sets (with pieces of access authorization information and pieces of address information contained therein) on the access authorization proving apparatus is necessary in order that the addresses respectively contained therein can be compared with one another. Therefore, the second aspect involves providing these pieces of information for the access authorization proving apparatus.

Providing can be performed for example by one or more servers, which is/are referred to hereinafter summarily as provision server. The provision server can obtain the respective pieces of information from respective data sources and/or at least partly generate them itself. A data source for the access authorization information is for example an access authorization generation apparatus, e.g. a key server. The shipment data sets can be obtained for example at the provision server from a shipment management system. The pieces of address information of the access control apparatuses and the users thereof can be obtained for example from an access control apparatus management system. The provision server obtains these pieces of information for example for all shipments to be delivered or collected in a predefined period (e.g. one day or one week), and for example for all access control apparatuses of a delivery company. The provision server can then provide these pieces of information in their entirety for the respective use by each access authorization proving apparatus, or in each case for example only a subset of said pieces of information, as will be explained in even greater detail below. The reduction of the set of pieces of information provided for use by respective access authorization proving apparatuses has the advantage that less storage space is required on the access authorization proving apparatuses and, in particular, the scope of the selection of access control apparatuses from which the respective user of the access authorization proving apparatus must select is considerably reduced. Moreover, the possibilities of misuse with a stolen or lost access authorization proving apparatus are reduced since with each access authorization proving apparatus access can be obtained only to a respective subset of the access control apparatuses present overall and security is thus increased. This procedure thus complements the above-explained reduction of the selection set such as is then performed on the access authorization proving apparatuses themselves. The provided pieces of information can be communicated for example directly or indirectly to the respective access authorization proving apparatuses for use. By way of example, the pieces of information can be transmitted via a network (such as the Internet, for example) to a computer or server, which then performs the transmission of the pieces of information to one or more access authorization proving apparatuses, for example by wireless transmission (e.g. via Wireless Local Area Network, WLAN, or via a mobile radio connection, for example via General Packet Radio Service (GPRS)) or by means of a serial connection (for example to a docking station to which the access authorization proving apparatus is connected at least temporarily). At the time of provision, the fact of which access authorization proving apparatus will obtain the provided pieces of information may for example not yet be fixed. By way of example, the pieces of information for different delivery areas are provided and then transmitted to the respective access authorization proving apparatus if an association between the respective access authorization proving apparatus and a respective delivery area is established, for example by registering an access authorization proving apparatus for a delivery area.

Further advantages of the present invention are described below on the basis of exemplary embodiments, the disclosure of which is intended to apply equally to all three aspects of the invention and all the respective categories (method, apparatus/system, computer program).

In one exemplary embodiment of all the aspects of the invention, the access authorization proving apparatus stores respectively different access authorization information for each access control apparatus from the plurality of access control apparatuses. The difference between the pieces of access authorization information may be the reason, for example, why, for each access control apparatus to which access is intended to be obtained, it is necessary to present a piece of access authorization information respectively specific to said access control apparatus.

In one exemplary embodiment of all the aspects of the invention, determining (and for example the further actions dependent on the determining) is only performed if the access authorization proving apparatus established that a valid routing code is present for the shipment. Said routing code may for example either originate from the identified shipment data set or likewise have been obtained for example by scanning a label of the shipment or by inputting into the access authorization proving apparatus by the user of the access authorization proving apparatus. A valid routing code is present, for example, if it comprises pieces of information concerning the zip code, street and house number of a shipment (and for example in addition a check digit is correct and/or a piece of product information (in accordance with digits 12-13 of the routing code) is present). If it is established that no valid routing code is present, determining (and for example the further actions dependent on the determining) could for example nevertheless be performed, e.g. if it is established that although either no routing code or only a routing code with a predefined street code (e.g. "444") that defines a fictitious routing code, for example, is present, at least for one access control apparatus and/or for at least one user of an access control apparatus information is present on the access authorization proving apparatus, for example address information associated with said user and/or the associated access control apparatus thereof and/or access authorization information for the access control apparatus associated with said user.

In one exemplary embodiment of all the aspects of the invention, determining (and for example the further actions dependent on the determining) is performed only if it is established from pieces of information (e.g. a product and/or service code) of the identified shipment data set that the shipment is permitted to be inserted into or collected from the compartment controlled by the access control apparatus.

In one exemplary embodiment of all the aspects of the invention, the selection of the access control apparatus from the one or more determined access control apparatus(es) is enabled if more than one access control apparatus was determined. In this case, therefore, determining the one or more access control apparatuses was unable to establish unambiguity, for example because the address information of the shipment does not contain a house number and a plurality of access control apparatuses exist in regard to the zip code and street. The user of the access authorization proving apparatus must then ultimately take the decision as to which of the remaining access control apparatuses is the correct one, for example by comparing a name associated with the shipment (e.g. name of the recipient of the shipment or of the person who has ordered the collection of a shipment) with one or more names of users who are assigned to the one or more determined access control apparatus(es).

By way of example, a dialog (for example via a graphical user interface of the access authorization proving apparatus) for selecting one access control apparatus from the determined access control apparatuses can be provided if a comparison of the address information of the shipment data set with respective address information associated with the access control apparatuses from the plurality of access control apparatuses and stored on the access authorization proving apparatus and/or with respective address information associated with the user(s) of the respective access control apparatus and stored on the access authorization proving apparatus yields a predefined degree of correspondence vis-à-vis at least two access control apparatuses from the plurality of access control apparatuses.

In one exemplary embodiment of all the aspects of the invention, the confirmation of the access control apparatus from the one or more determined access control apparatus (es) is enabled if only the access control apparatus was determined and/or after the access control apparatus was selected by the user of the access authorization proving apparatus from the one or more determined access control apparatus(es). By way of example, only one access control apparatus is determined if a complete correspondence of the address information of the shipment to the address information of the access control apparatus and/or the address information of a user of the access control apparatus is present, that is to say e.g. vis-à-vis zip code, street and address. Information concerning the determined access control apparatus, in particular concerning the users assigned thereto, can then be indicated for control purposes, for example, in order that the user of the access authorization proving apparatus can coordinate a person associated with the shipment with the users of the access control apparatus and, upon correspondence, can confirm the access control apparatus. Confirming can comprise and/or necessitate previously selecting one of the users of the access control apparatus.

By way of example, a dialog (for example via a graphical user interface of the access authorization proving apparatus) for confirming one access control apparatus from the determined access control apparatus(es) by a user of the access authorization proving apparatus can be provided if a comparison of the address information of the shipment data set with the address information associated with the access control apparatus and/or with at least one user of the access control apparatus yields a predefined degree of correspondence and said degree of correspondence occurs only for this one access control apparatus from the plurality of access control apparatuses and/or the at least one user of said access control apparatus.

Enabling the selection and/or the confirmation can be performed for example after selection of a menu option by the user of the access authorization proving apparatus which is present if (for example only if) at least one access control apparatus was determined on the basis of the comparison, as explained above. Additionally or alternatively, said menu option can be present if (for example only if), although no valid address information of the shipment—in particular no valid routing code of the shipment—is present, address information for at least one access control apparatus or at least one user of an access control apparatus is stored on the access authorization proving apparatus.

In one exemplary embodiment of all the aspects of the invention, a number of the one or more determined access control apparatus(es) decreases with an increasing degree of correspondence between the address information of the shipment data set and the pieces of address information respectively associated with the access control apparatuses and/or with the users thereof, in particular such that only one access control apparatus is determined if the address information associated with this access control apparatus and/or with the user(s) thereof completely corresponds to the address information of the shipment data set. If, for example, only a correspondence in the zip code is required, this generally leads to a larger number of determined access control apparatus than in a scenario in which a correspondence in the zip code and the street is required, or than in a scenario in which a correspondence in zip code, street and house number is required. As already mentioned, the degree of correspondence can be predefined and adapted for example to the respective requirements. By way of example, a user of the access authorization proving apparatus may prefer a high degree of correspondence in order to have to select only from a small set of determined access control apparatus.

One exemplary embodiment of all the aspects of the invention involves outputting an indication of the possibility for using an access control apparatus if the address information of the shipment data set has a predefined degree of correspondence to at least one piece of address information associated with an access control apparatus and/or to at least one piece of address information associated with a user of an access control apparatus. The predefined degree of correspondence can be for example a complete correspondence, e.g. a correspondence in the zip code, street and house number. With this high degree of correspondence it is advantageous to indicate to the user of the access authorization proving apparatus at any rate the possibility of the use of an access control apparatus for the present shipment, in order to spare said user a generally more time-consuming alternative delivery process. Outputting the indication takes place for example only if the access authorization proving apparatus additionally established that the information of the shipment is valid. If the information of the shipment is a routing code, for example, a validity of the routing code can be assumed, for example, if it comprises pieces of information concerning the zip code, street and house number of a shipment (and for example in addition a check digit is correct and/or a piece of product information (in accordance with digits 12-13 of the routing code) is present).

In one exemplary embodiment of all the aspects of the invention, obtaining the information of the shipment comprises wirelessly, in particularly optically, capturing the information of the shipment by means of the access authorization proving apparatus. Optically capturing can be performed for example by means of an internal or external scanning apparatus of the access authorization proving apparatus, particularly if the latter is designed as a handheld scanner. The scanning apparatus can capture for example a visible code on a shipment (e.g. on the label thereof) and recognize it (e.g. by Optical Character Recognition (OCR)), such that it is present in electronic form and can be processed further by the access authorization proving apparatus. The code can be a barcode, for example a 1D or 2D barcode. The code can also be an alphanumeric character sequence which is machine-written or handwritten, for example. Alternatively, capture can be performed via radio or via electric or magnetic fields, for example by means of Radio Frequency Identification (RFID) or Near Field Communication (NFC), particularly if the shipment is provided with an RFID or NFC tag correspondingly programmed to the shipment (e.g. the identifier thereof).

In one exemplary embodiment of all the aspects of the invention, obtaining the information of the shipment comprises capturing an input of the information of the shipment by a user of the access authorization proving apparatus by means of a user interface of the access authorization proving apparatus. The information of the shipment is then obtained by the access authorization proving apparatus by virtue of the fact that the user of the access authorization proving apparatus or some other person inputs said information into the access authorization proving apparatus, for example by means of a keyboard (which for example is displayed on a touchscreen ("soft keys") or can be realized by physical keys ("hard keys")). The information of the shipment is applied for example in plain text on the shipment.

In one exemplary embodiment of all the aspects of the invention, obtaining the information of the shipment comprises selecting or choosing the information of the shipment stored on the access authorization proving apparatus by a user of the access authorization proving apparatus. The information of the shipment may therefore also already be stored in the access authorization proving apparatus, for example as a list of shipments to be collected. The user of the access authorization proving apparatus then selects an entry from said list, for example, which has the effect that the access authorization proving apparatus obtains information about the shipment thus selected and can assign a shipment data set to it.

In one exemplary embodiment of all the aspects of the invention, the shipment data sets comprise only shipment data sets of shipments which are assigned to a user of the access authorization proving apparatus in a predefined period. In particular, here the access authorization proving apparatus does not store (and for example also does not obtain) any shipment data sets for shipments which are not assigned to the user of the access authorization proving apparatus in the predefined period. As already explained, as a result the storage requirement on the access authorization proving apparatus can be kept small and the process of identifying the shipment data set can also be made less complex since fewer shipment data sets have to be searched.

In one exemplary embodiment of all the aspects of the invention, the respective address information associated with the access control apparatuses and stored on the access authorization proving apparatus and/or the address information respectively associated with one or more user(s) (7) of the respective access control apparatus and stored on the access authorization proving apparatus (3) comprise(s) only address information associated respectively with such access control apparatuses and/or only address information respectively associated with respectively one or more user(s) (7) of such access control apparatuses for which the respective address information and/or the respective address information of their respective one or more users correspond(s)

in accordance with a predefined degree of correspondence to the address information of at least one of the stored shipment data sets.

The communicated access authorization information can then originate for example from a plurality of pieces of access authorization information stored on the access authorization proving apparatus, wherein these pieces of access authorization information only comprise pieces of access authorization information from those access control apparatuses for which the respective address information and/or the respective address information of their respective one or more users correspond(s) in accordance with a predefined degree of correspondence to the address information of at least one of the stored shipment data sets.

By way of example, therefore, only address information from such access control apparatuses and/or address information from the users of such access control apparatuses which are associated with the user of the access authorization proving apparatus are/is stored (and for example obtained at the access authorization proving apparatus). The association between the access control apparatus and the user of the access authorization proving apparatus can consist in particular in the fact that the address information of the access control apparatus and/or the address information of at least one user of the access control apparatus corresponds in accordance with a predefined degree of correspondence to the address information of at least one shipment data set from the stored shipment data sets. In this case, for example, both the shipment data set and the access control apparatus are assigned to the user of the access authorization proving apparatus. This can occur for example in the context of an area cutting process (as a possible part of the second aspect of the invention) in which a respective delivery area is assigned to the shipments associated with the shipment data sets and a check is then made to establish which access control apparatuses can be assigned to this area. Then for example only the shipment data sets of shipments assigned to a delivery area and the pieces of information (access authorization information to access control apparatuses; pieces of address information of the access control apparatuses and/or pieces of address information of the users of the access control apparatuses) of the access control apparatuses assigned to said delivery area are transmitted to the access authorization proving apparatus and stored there, for example if a user of the access authorization proving apparatus registers for said delivery area.

By way of example, the situation may then occur that a first shipment is assigned to a delivery area A and a second shipment is assigned to a delivery area B, wherein the recipients of the first shipment are registered for an access control apparatus in the delivery area A. On the basis of the first shipment, the pieces of access authorization information and the address information for the access control apparatus and the address information for the users of the access control apparatus (that is to say of the recipient of the first shipment and of the recipient of the second shipment) are then provided for the access authorization proving apparatus of the delivery area A (on the basis of the correspondence of the shipment address information to the access control apparatus address information and the address information of the recipient of the first shipment). On the basis of the second shipment, the pieces of access authorization information and the address information for the access control apparatus and the address information for the users of the access control apparatus (that is to say of the recipient of the first shipment and of the recipient of the second shipment) are then likewise provided to the access authorization proving apparatus of the delivery area B (on the basis of the correspondence of the shipment address information to the address information of the recipient of the second shipment).

As a result of this prefiltering of information transmitted to the access authorization proving apparatus and stored there, which is performed for example by a provision server, firstly the storage requirement on the access authorization proving apparatuses and also the computational complexity of the process of determining the one or more access control apparatus(es) on the access authorization proving apparatus are minimized since only the address information of the access control apparatuses assigned to the user of the access authorization proving apparatus (and/or the address information of the user(s) of said access control apparatuses) has to be coordinated with the pieces of address information of the shipment (whose shipment data set was identified), but not the address information of all the access control apparatuses and/or of the users thereof. The security is additionally increased since then only pieces of access authorization information for a smaller number of access control apparatuses are present on the access authorization proving apparatus and misuse with fewer access control apparatuses is thus possible in the case of a lost or stolen access authorization proving apparatus.

In one exemplary embodiment of all the aspects of the invention, the access authorization information associated with the respective access control apparatus is contained in a respective access control apparatus data set for the respective access control apparatus. By way of example, the access authorization information is communicated to the access authorization proving apparatus then in such access control apparatus data sets (for example from a provision server) and is stored there. The respective access control apparatus data set can then for example also comprise the address information associated with the respective access control apparatus, and for example also further parameters, such as e.g. an identifier of the access control apparatus or of a component thereof or of an apparatus which is controlled by the access control apparatus.

In one exemplary embodiment of all the aspects of the invention, a respective piece of address information associated with a respective user of a respective access control apparatus and a respective identifier of the respective access control apparatus are contained in a respective user data set. By way of example, the pieces of address information of the users of the access control apparatus are communicated in such user data sets to the access authorization proving apparatus and stored there. The user data sets are then associated with the respective access control apparatus in particular via the identifier of this respective access control apparatus.

In particular only user data sets for the user(s) of those access control apparatuses for which access control apparatus data sets are also obtained are then obtained at the access authorization proving apparatus.

It is possible to obtain for example either only pieces of address information (e.g. in user data sets) of that user of an access control apparatus which is also actually associated with a shipment in the predefined period (that is to say for example is intended to obtain said shipment or has ordered it for collection) or respectively the pieces of address information of all users of access control apparatuses which are assigned to the user of the access authorization proving apparatus in the predefined period (in particular because in the predefined period a shipment is intended to be delivered into the respective access control apparatus or to be collected therefrom), even if these in part are not associated with a shipment in the predefined period. The first of the two variants mentioned requires less storage space on the access authorization proving apparatus and also takes up less computing power in the process of determining, since fewer pieces of address information of users have to be coordinated with the pieces of address information of the shipment. However, the second variant allows the user of the access control apparatus to have a better overview of the users assigned to an access control apparatus, which may possibly be advantageous on site. In the provision server, the procedure in providing the pieces of information for an access authorization proving apparatus may be for example such that firstly shipments are assigned to a delivery area and then for each shipment on the basis of its address information (in particular its routing code, and possibly also the name information, that is to say the first name and surname or only surname), a determination is made regarding to which user of an access control apparatus this shipment is assigned. On the basis of the address information of the user (e.g. from the user data set thereof), it is then established which access control apparatus is assigned to this user. Then either the shipment data set of the shipment, the access control apparatus data set of the access control apparatus and the address information of the user (e.g. the user data set thereof), or the shipment data set, the access control apparatus data set and the respective pieces of address information of all the users (e.g. the user data sets thereof) who are assigned to this access control apparatus are provided for the access authorization proving apparatus(es) of this delivery area. This is then repeated for example for all shipments of a delivery area.

In one exemplary embodiment of all the aspects of the invention, the same access authorization information associated with an access control apparatus is respectively stored at least on two access authorization proving apparatuses. By way of example, respective pieces of access authorization information for a plurality of access control apparatuses can also be stored identically on the two or on further access authorization proving apparatuses. This may for example allow the users of the at least two access authorization proving apparatuses in each case to be able to obtain access to the same access control apparatus, for example for delivery and/or collection of a plurality of shipments in a predefined period (e.g. one day).

In one exemplary embodiment of all the aspects of the invention, the access authorization information can only be communicated to the access control apparatus (4) if there is a predefined degree of correspondence between the address information of the shipment data and the address information associated with the access control apparatus and/or the address information associated with the user(s) of the access control apparatus. This requirement is asserted for example by the access authorization proving apparatus, for example by virtue of a predefined degree of correspondence (for example at least correspondence in the zip code and street) being required for determining, and communication of access authorization information to an access control apparatus being possible only if the latter was selected from the determined one or more access control apparatuses and/or confirmed by the user of the access authorization proving apparatus.

This requirement serves in particular to avoid misuse of an access authorization proving apparatus, for example for the case where an access authorization proving apparatus was lost or stolen and contains access authorization information for a plurality of access control apparatuses which is present at least in part also on other access authorization proving apparatuses (as in the previous exemplary embodiment). In order to block the lost/stolen access authorization proving apparatus (for example on the basis of an identifier of the access authorization information), for example at the affected access control apparatuses for which the access authorization proving apparatus comprised access authorization information, this access authorization information can be blocked. This has the effect, however, that possibly other access authorization proving apparatuses which comprise the respective access authorization information might also no longer obtain access to the respective access control apparatus during the blocking. As an advantageous alternative or additional variant, in accordance with the present exemplary embodiment of the invention, the limitation of the possibility for use of each access authorization proving apparatus only for those access control apparatuses for which a shipment is also actually present (this is proved on the basis of the obtained information of the shipment (e.g. in particular information scanned in from the shipment) vis-à-vis the access authorization proving apparatus) effectively prevents such misuse, that is to say for example the obtaining of access at access control apparatuses for which no shipment is present, in order for example to steal shipments situated therein.

In one exemplary embodiment of all the aspects of the invention, the communicating of information (in particular the access authorization information) from the access authorization proving apparatus to the access control apparatus is performed wirelessly, in particular by means of Bluetooth communication. The Bluetooth communication can manage without Bluetooth pairing, for example, because the MAC address of the access control apparatus was made known to the access authorization proving apparatus. By way of example, the respective MAC address of the access control apparatus is contained in the access control apparatus data set, which also contains the access authorization information and the address information for the respective access control apparatus.

The above-described exemplary embodiments and exemplary configurations of all aspects of the present invention, which initially stand by themselves in principle, should also be understood to be disclosed in all combinations with one another.

Further advantageous exemplary configurations of the invention can be gathered from the following detailed description of some exemplary embodiments of the present invention, in particular in conjunction with the figures. However, the figures accompanying the application are intended to serve only for the purpose of clarification, but not for determining the scope of protection of the invention. The accompanying drawings are not necessarily true to scale and are merely intended to reflect by way of example the general concept of the present invention. In particular, features contained in the figures ought not under any circumstances be deemed to be a necessary part of the present invention.

BRIEF SUMMARY OF THE SEVERAL VIEWS OF THE DRAWING

In the figures:

FIGS. 5a-f: show schematic illustrations of exemplary screen displays on an access authorization proving apparatus according to the present invention.

DETAILED DESCRIPTION OF THE INVENTION

Figure 1:
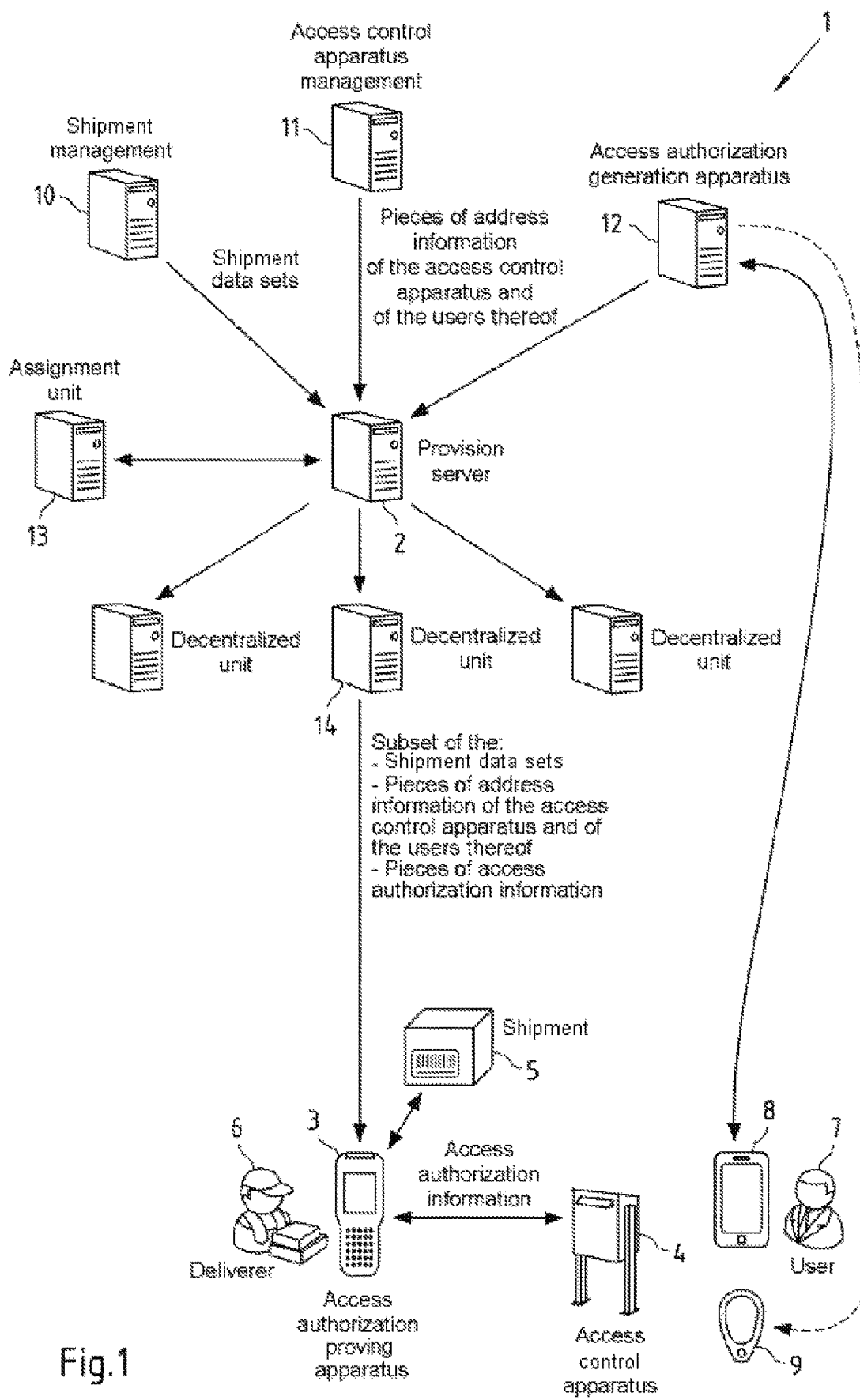
FIG. 1: shows a schematic illustration of one exemplary embodiment of a system according to the present invention.

FIG. 1 is a schematic illustration of one exemplary embodiment of a system 1 according to the present invention. The system 1 comprises an access authorization proving apparatus 3 in accordance with the first aspect of the invention, which in the present case is embodied by way of example as a handheld scanner. Accordingly, in the present case, the user 6 of the access authorization proving apparatus is also by way of example a deliverer of one or more shipments, of which a shipment 5 is illustrated by way of example as a parcel. However, references hereinafter to the deliverer 6 should also be understood as general disclosure concerning the user 6 of the access authorization proving apparatus. With the access authorization proving apparatus 3 the deliverer 6 can obtain access at an access control apparatus 4 which controls a compartment into which shipments can be inserted by the deliverer or from which shipments can be collected by the deliverer. The access control apparatus 4 can be for example a parcel box or a part thereof and is accordingly illustrated by way of example as a parcel box in FIG. 1. In order to obtain access to the access control apparatus, the deliverer 6 must select access authorization information for the access control apparatus 6 on the access authorization proving apparatus 3 and cause it to be transmitted to the access control apparatus 4. The simplification of this selection is the subject matter of the first aspect of the invention and is based inter alia on the capture of pieces of information of the shipment 5, for example the capture of a barcode (in particular an identification code) from a label of the shipment 5 by means of an optical scanning module contained in the access authorization proving apparatus 3. Furthermore, the access authorization proving apparatus 3 for realizing the first aspect of the invention requires sets of access authorization information, address information of access control apparatuses and/or address information of users of the access control apparatuses, and shipment data sets. These are provided by the provision server 2 in accordance with the second aspect of the invention and are distributed to access authorization proving apparatuses via the decentralized units 14. The decentralized units 14 can constitute computers or servers, for example, which receive the provided information from the provision server 2 via a network (e.g. the Internet) and then transmit it to one or more access authorization proving apparatuses 3 in a wired manner (for example via a docking station which for example is connected to the decentralized unit 14 via a serial interface and into which the access authorization proving apparatus 3 is inserted at least temporarily) or wirelessly (e.g. via a Wireless Local Area Network (WLAN) or GPRS). The provided pieces of information are provided for example for respective delivery areas, and an access authorization proving apparatus 3 then obtains the provided pieces of information for that delivery area (or a plurality of delivery areas) with which it is associated (for example on one day). Alternatively, it is also conceivable for the provided pieces of information to be communicated directly to one or more access authorization proving apparatuses, for example via a network such as the Internet, for example, to which both the provision server 2 and the receiving access authorization proving apparatus 3 are then connected, or via a wireless network such as a mobile radio network, for example. The provision server 2 compiles these pieces of information as a subset of a larger set of pieces of information which are respectively obtained from a shipment management unit 10 (shipment data sets), an access control apparatus management unit 11 (pieces of address information of the access control apparatus and/or address information of the users of the access control apparatuses) and an access authorization generation apparatus 12 (pieces of access authorization information). In this providing, the provision server 2 is supported by the assignment unit 13, which, however, can also be part of the provision server 2. The shipment management unit 10 collects for example pieces of information concerning shipments which have to be delivered to a plurality of users 7 and/or be collected by the latter, in the form of shipment data sets which comprise for example at least one piece of address information of the shipment (e.g. delivery or collection address). The address information can be represented for example by an identifier, for example a routing code, or be present in addition to a routing code. The shipment data sets also comprise an identifier of the respective shipment, and can for example contain further pieces of information concerning the shipment. For example independently of the option of being able to introduce shipments into, or collect them from, compartments controlled by access control apparatuses, the shipment data sets can already be used in the system in FIG. 1 to deliver or collect shipments in a conventional way (through contact with the respective shipment recipient or shipment originator) and/or to enable shipment tracking. In this respect, this information present is used advantageously by the exemplary embodiments of the present invention in order that the option of being able to introduce shipments into, or collect them from, compartments controlled by access control apparatuses is also made as convenient and efficient as possible for the deliverer. The access control apparatus management 11 stores information concerning access control apparatuses and users who have registered for the respective access control apparatuses. This information includes for example the address information concerning the access control apparatuses and the users thereof.

The access authorization generation apparatus 12 generates access authorizations for the access control apparatuses. Examples of different types of access authorizations and the checking and authentication thereof on the part of the recipient have already been explained above. By way of example, the access authorization generation apparatus 12 and a respective access control apparatus 4 each have a key $s_j$, on the basis of which pieces of access authorization information generated as access token $t_{ij}$ by the access authorization generation apparatus 12 can be authenticated. Alternatively, the access authorization generation apparatus knows for example the pieces of access authorization information of all access control apparatuses 4, designed as individual codes in each case, and can make them available.

The access authorization generation apparatus 12 also generates access authorizations which are stored on a cellular phone 8 or a tag (e.g. an NFC or RFID tag) 9 of a (more particularly registered) user (e.g. owner) 7 of the access control apparatus 4 in order to be able to obtain access to the access control apparatus for the user 7 as well, so that the user 7 can withdraw shipments 5 inserted into the access control apparatus by the deliverer 6 or can insert shipments 5 provided for collection by the deliverer 6 into the access control apparatus 4. The collection of shipments 5 is ordered by the user 7 for example by telephone, via an application on said user's cellular phone or via an online portal.

Figure 2:
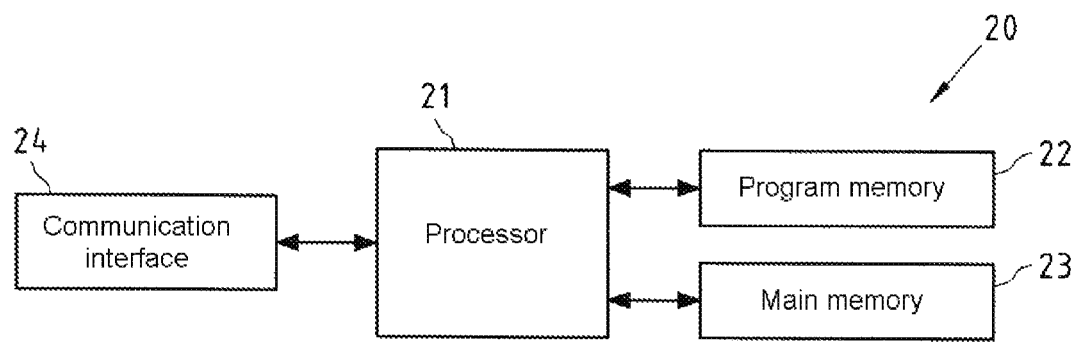
FIG. 2: shows a schematic illustration of one exemplary embodiment of an apparatus according to the present invention.

FIG. 2 shows a schematic illustration of one exemplary embodiment of an apparatus 20 according to the present invention. Apparatus 20 can represent for example the access authorization proving apparatus 3 or the provision server 2 of the system 1 from FIG. 1.

Apparatus 20 comprises a processor 21 with assigned main memory 23 and program memory 22. The processor 21 executes for example program instructions stored in the program memory 22. The program instructions perform the method in accordance with the first or second aspect of the invention and/or control it. Thus, the program memory 22 contains a computer program according to the first or second aspect of the invention and constitutes a computer program product for storing it.

The program memory 22 can be for example a persistent memory, such as a read-only memory (ROM) for example. The program memory can for example be fixedly connected to the processor 21, but can alternatively also be releasably connected to the processor 21, for example as a memory card, floppy disk or optical data carrier medium (e.g. a CD or DVD). Further information can also be stored in the program memory 22, or in a separate memory. If apparatus 5 is the access authorization proving apparatus 3, said information can include for example the information provided by the provision server 2 (in particular shipment data sets, pieces of access authorization information and pieces of address information of access control apparatuses and/or of users of access control apparatuses).

The main memory 23 is used for example for storing temporary results during the processing of the program instructions; this is for example a volatile memory, such as a random access memory (RAM), for example.

The processor 21 is further operatively connected to a communication unit 24, which enables information to be exchanged with external apparatuses for example.

If the apparatus 20 represents the provision server 2, the communication unit 24 can be configured for example for communication via a network such as the Internet, for example, in order for example to be able to transmit information to, and/or receive information from, one or more of the following units:
  the shipment management unit 10,
  the access control apparatus management unit 11,
  the access authorization generation apparatus 12,
  the assignment unit 13, and
  the decentralized units 14.

If the apparatus 20 represents the access authorization proving apparatus 3, the communication unit 24 can comprise one or more of the following, for example:
  an interface for wireless (e.g. by WLAN) or wired reception (e.g. via a docking station) of information from a decentralized unit 14,
  an interface for communication via a cellular mobile radio network, e.g. for communication with a shipment tracking server (which may be e.g. part of the shipment management unit 10) and/or the provision server 2 for directly obtaining pieces of information provided,
  a radio interface for communication with the access control apparatus 4, in particular a Bluetooth interface and/or an RFID interface and/or NFC interface.

The apparatus 20 can also contain further components, for example a graphical user interface, in order to permit a user 6 to interact with the apparatus 20, particularly if apparatus 20 constitutes an access authorization proving apparatus 3. If apparatus 20 constitutes a handheld scanner, the apparatus 20 can comprise for example a unit for in particular optically capturing information (e.g. a scanner), and/or for example a user interface capturing handwritten inputs, such as e.g. a signature.

The components 21-24 can be embodied for example jointly as a module or unit, or can be embodied at least partly as individual modules, in order to ensure easy exchangeability in the event of possible defects.

Figure 3:
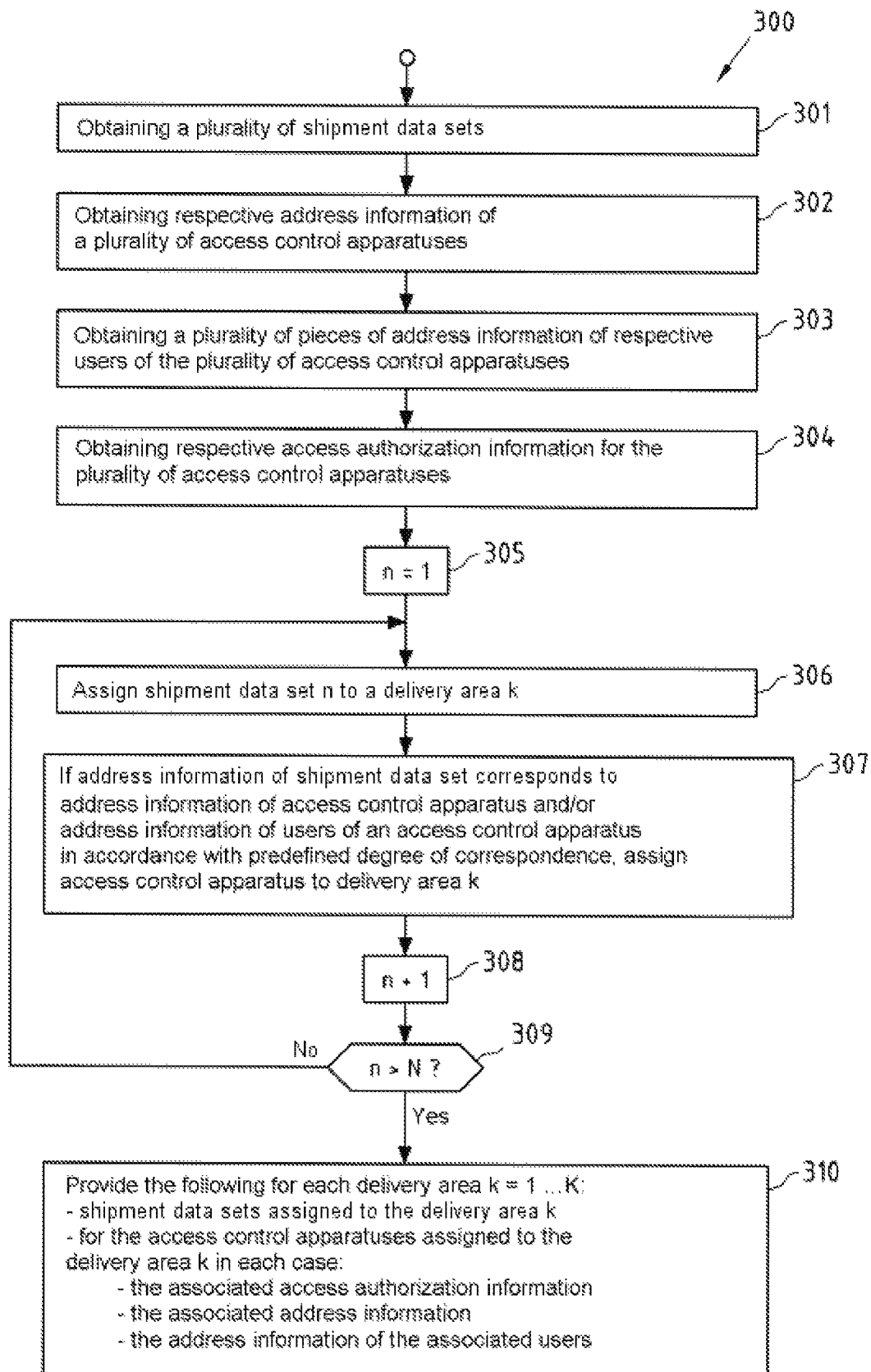
FIG. 3: shows a flow diagram of one exemplary embodiment of a method in accordance with the second aspect of the present invention.

FIG. 3 illustrates a flow diagram 300 of one exemplary embodiment of a method according to the second aspect of the invention. The method is performed for example by the provision server 2 and the assignment unit 13 from FIG. 1, for example by the processor 21 thereof (see FIG. 2), wherein the program memory 22 can then contain program code which induces the processor 21 to perform or control the method 300. As already mentioned, the assignment unit 13 can also be comprised as part of the provision server 2.

A first step 301 involves obtaining a plurality of shipment data sets from the shipment management unit 10 at the provision server 2. This involves for example all shipments to be delivered or collected in a predefined period (e.g. one day) on the part of a delivery company (e.g. Deutsche Post DHL), that operates the system 1 from FIG. 1.

A step 302 involves obtaining from the access control apparatus management unit 11 pieces of address information of a plurality of access control apparatuses 4 at the provision server 2, for example of all the access control apparatuses of the delivery company.

A step 303 involves obtaining from the access control apparatus management unit 11 pieces of address information of the respective one or more users of the plurality of access control apparatuses 4. The pieces of information in steps 302 and 303 can for example also be obtained jointly at the provision server 2.

In step 304, respective pieces of access authorization information generated by the access authorization generation apparatus 12 for the access control apparatuses 4 of the plurality of access control apparatuses are obtained at the provision server 2. In this case, the pieces of access authorization information of a respective access control apparatus can be written by the provision server 2 for example together with the pieces of address information of a respective access control apparatus into an access control apparatus data set for the respective access control apparatus. In this case, the assignment of the access authorization information to an access control apparatus can be performed for example on the basis of an identifier—contained in the access authorization information—for the access control apparatus or for one of the components thereof (e.g. a lock), with the aid of which the access control apparatus can be identified.

The pieces of information obtained in steps 301-304 are then assigned to individual delivery areas from a plurality of delivery areas on the basis of steps 305-309. A delivery area is then later assigned to a deliverer 6, for example, and the provided pieces of information assigned to said delivery area are transmitted to the access authorization proving apparatus 3 of the deliverer 6.

In a step 305, for this purpose, firstly a counter n is set to 1. The counter runs from 1 to N, wherein N denotes the number of shipment data sets obtained in step 301.

In step 306, the n-th shipment data set from the shipment data sets obtained is assigned, for example by the assignment unit 13, to a delivery area k, wherein k is an identifier for delivery areas which runs from 1 to K, for example, and K is the number of delivery areas present overall for the delivery company. The assignment of the shipment data sets to the suitable delivery areas is performed for example taking account of the delivery or collection address of the shipment associated with the shipment delivery set. By way of example, each delivery area is assigned to a respective geographical region, and a shipment data set is assigned to a delivery area if the delivery or collection address of the shipment is situated in said delivery area. However, this assignment can also be dynamically adjusted by also taking account of the available delivery personnel per delivery area and the volume of shipment per delivery area, which can have the effect that shipments which are to be delivered or collected particularly in marginal regions of delivery areas are not assigned to the actual delivery area in which the delivery or collection address is situated, but rather in a neighboring delivery area in which the deliverer has fewer shipments to process than the deliverer in the actual delivery area. This process of assigning shipment data sets (and thus shipments) to delivery areas is also referred to as "area cutting" and, in the system in FIG. 1, is for example also performed independently of the option of delivering shipments into compartments controlled by access control apparatuses, or collecting them therefrom.

In step 307, an attempt is made to assign pieces of information of an access control apparatus to the shipment data set n assigned to a delivery area k, in order thus also to achieve an assignment of said pieces of information to the delivery area k. This is achieved on the basis of a comparison of the address information of the shipment data set with the address information of the access control apparatuses (in particular of all access control apparatuses for which pieces of address information were obtained in step 302) and/or with the address information of the respective one or more users of the access control apparatuses (in particular of all users for which pieces of address information were obtained in step 303). A predefined degree of correspondence in the pieces of address information is required here in order that an assignment of the access control apparatus associated with the address information (directly or via one of its users) to the delivery area k can be performed. By way of example, the predefined degree of correspondence requires that at least the zip code, or at least the zip code and the street, or at least the zip code, street and house number correspond. It should be pointed out that the coordination of the pieces of address information can also be based purely on the address information of the shipment data set n and the address information of the access control apparatus, that is to say that the address information of the users of the access control apparatus is disregarded. This may be expedient for example if said address information is not even present (because e.g. step 303 does not take place) or if a user of a parcel box must always have the same address as the access control apparatus. In more flexible systems in which one or more users of the access control apparatus can also have addresses deviating from the address of the access control apparatus, such that for example a plurality of neighbors can use the same access control apparatus, it is possible either to take account of the pieces of address information of the access control apparatuses and the pieces of address information of the users, or only to take account of the pieces of address information of the users in the coordination with the address information of the shipment data set n. The latter variant may also be preferred since the addresses of the shipments are oriented ultimately toward the addresses of the users of the access control apparatus and to a lesser extent to the addresses of the access control apparatus itself.

In step 308 the counter n is incremented by one, and in step 309 a check is made to establish whether all the shipment data sets have already been processed (assigned). If this is not the case, steps 306-309 are performed for the next shipment data set of the N shipment data sets obtained. Otherwise the assignment of the shipment data sets and of the access control apparatuses to the delivery areas is terminated, and the flow diagram advances to step 310.

Step 310 then involves providing the information specific to each delivery area k (k=1 . . . K), that is to say the shipment data sets assigned to the delivery area k and, for each delivery area, the following information for the access control apparatuses respectively assigned to said delivery area: the access authorization information associated with the respective access control apparatus, the address information associated with the respective access control apparatus, and the pieces of address information associated with the respective users of the respective access control apparatus. The address information of the access control apparatuses and the access authorization information can here once again be contained in an access control apparatus data set and be provided jointly. However, the address information associated with the access control apparatuses does not have to be provided for example if it is not required in the access authorization proving apparatus 3, for example because there the address coordination performed in the context of the first aspect of the invention is based on the address information of an identified shipment and the pieces of address information of the users of the access control apparatus.

The method described in steps 301-310 can be performed anew daily, for example, in order to obtain an assignment of shipments and access control apparatuses to delivery areas for each day and to be able to provide the resultant pieces of information for transmission to access authorization proving apparatuses.

Figure 4A:
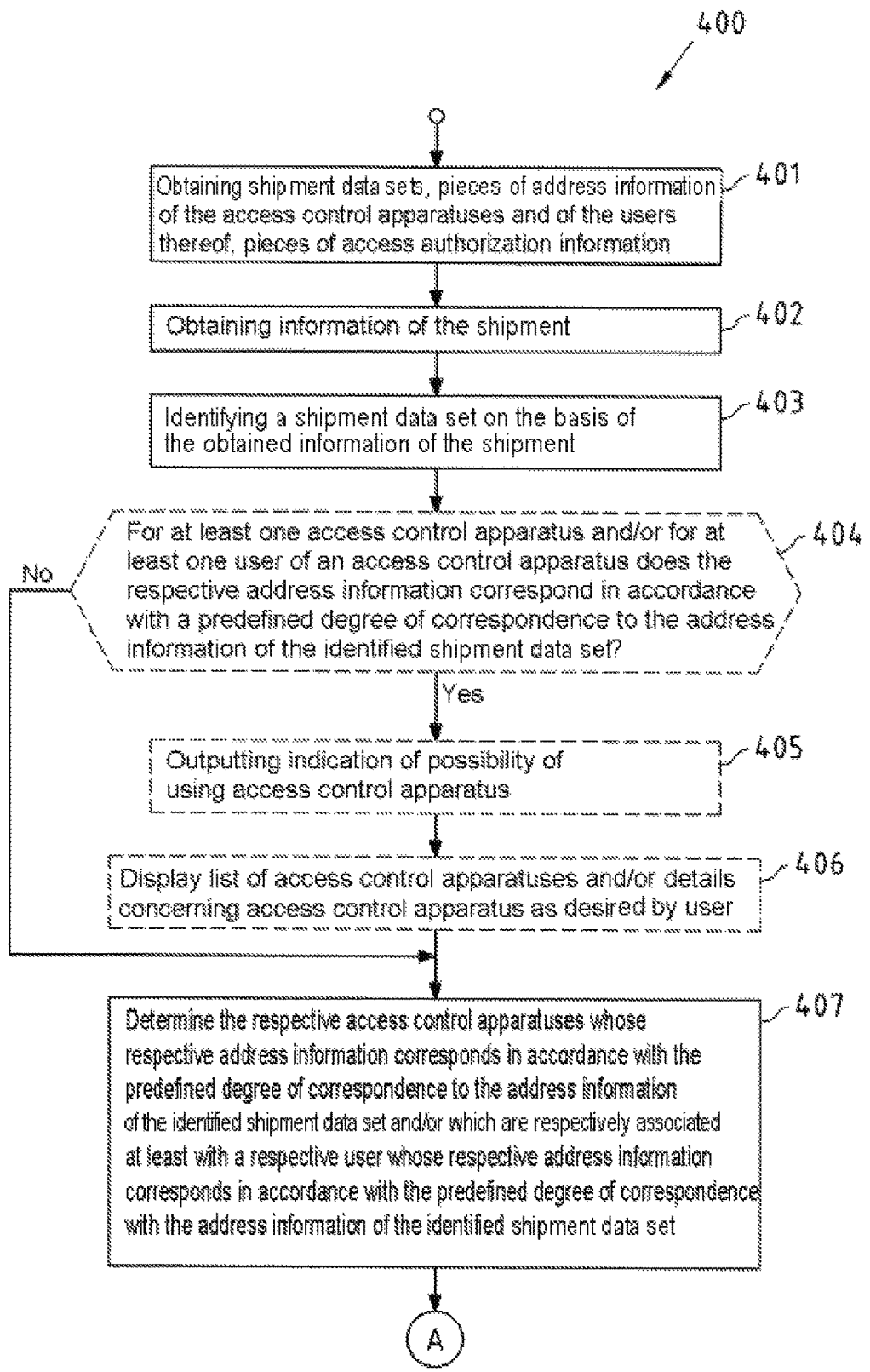
FIGS. 4a/b: show a flow diagram of one exemplary embodiment of a method in accordance with the first aspect of the present invention.
Figure 4B:
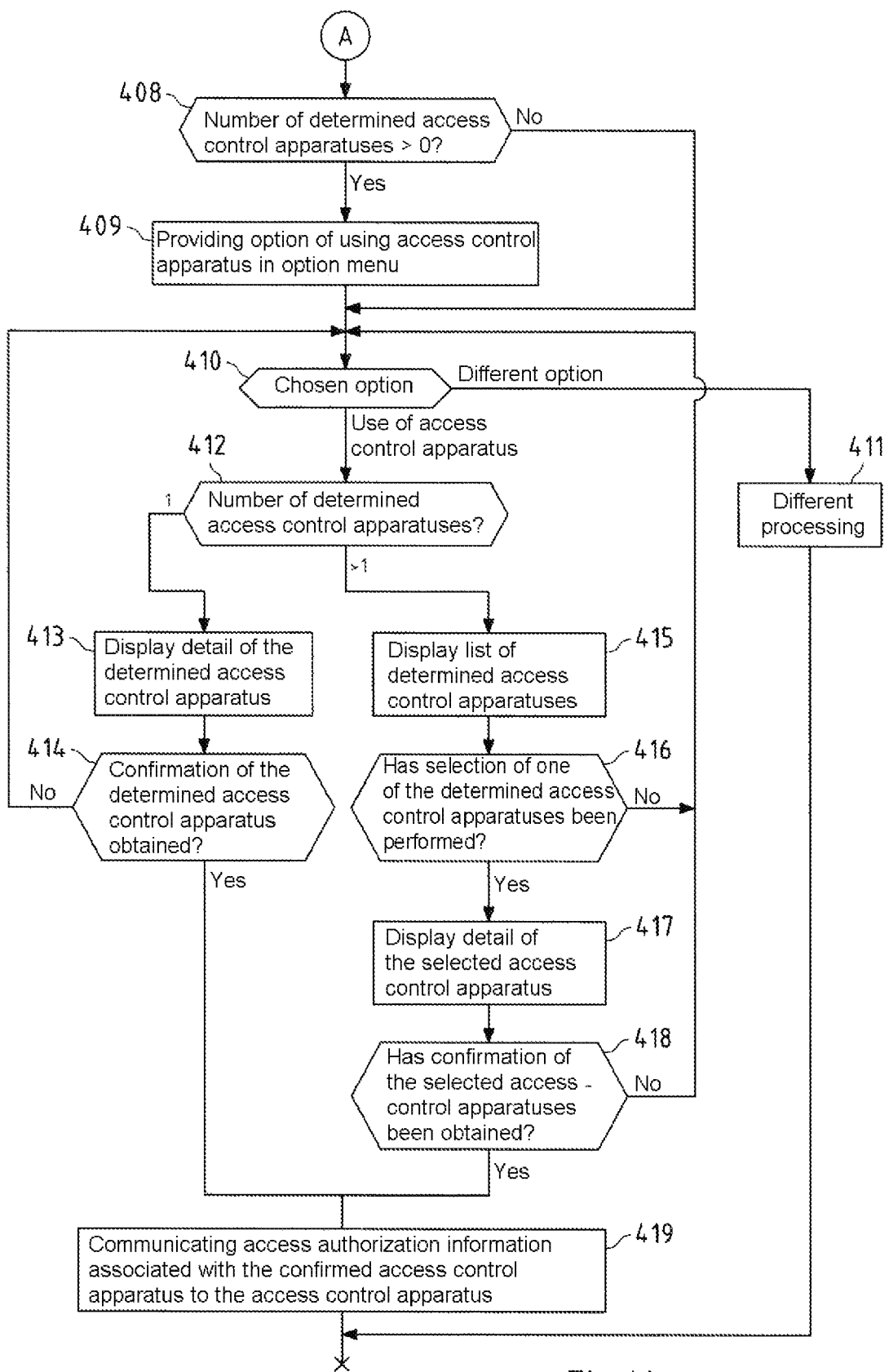

FIGS. 4a/b illustrate a flow diagram 400 of one exemplary embodiment of a method according to the first aspect of the invention. The method is performed for example by the access authorization proving apparatus 3 from FIG. 1, for example by the processor 21 thereof (see FIG. 2), wherein the program memory 22 can then contain program code which induces the processor 21 to perform or control the method 400.

A first step 401 involves obtaining shipment data sets, address information of access control apparatuses and/or address information of users of access control apparatuses and pieces of access authorization information. This involves in particular the pieces of information provided for a delivery area by the provision server 2 in step 310 of the flow diagram in FIG. 3. As explained, this involves a subset which is significantly reduced in comparison with the entire information contained in the system 1 in FIG. 1 and which facilitates for the deliverer 6 in particular the selection of authorization information for obtaining access at a concrete access control apparatus 4. This selection is simplified even further by the subsequent steps. The shipment data sets obtained in step 401 relate in particular only to shipments 5 which are associated with the deliverer 6, that is to say which have to be delivered or collected by said deliverer in the latter's delivery area.

A second step 402 involves obtaining information from the shipment 5. This can be performed in particular by scanning in an identification code of the shipment 5 by means of the access authorization proving apparatus 3 (e.g. in the case of a delivery), or alternatively by inputting the identification code into the access authorization proving apparatus 3 (e.g. in the case of a collection).

Step 403 involves identifying one of the shipment data sets obtained in step 401 on the basis of the obtained information of the shipment 5 (for example on the basis of the information of the shipment 5 that is likewise contained in the shipment data set, in particular the identification code). The shipment data set contains at least address information, e.g. in the form of a routing code, which, in the subsequent steps, is coordinated with the pieces of address information of the access control apparatus and/or with the pieces of address information of the users thereof in order to determine access control apparatuses which are potentially relevant to the delivery/collection (for example access control apparatuses in the same street in which delivery/collection is intended to be performed).

In this case, the subsequent steps 404-419 are performed for example only if, on the basis of a check of product or service information contained in the shipment data, for example, concerning the shipment, it was established that a delivery or collection of the shipment in/from a compartment controlled by an access control apparatus is actually envisaged.

The subsequent steps 404-419 are performed for example also only if it was established that a valid routing code is present. Said routing code can either originate from the shipment data set identified in step 403 or likewise have been obtained for example by scanning from a label of the shipment 5 or by inputting into the access authorization proving apparatus by the deliverer 5. A valid routing code is present for example if it comprises information concerning the zip code, street and house number of a shipment (and, for example, in addition a check digit is correct).

If it is established that no valid routing code is present, steps 404-419 could for example nevertheless be performed, e.g. if it is established that although either no routing code or only a routing code with a predefined street code (e.g. "444") that defines a fictitious routing code, for example, is present, at least for one access control apparatus and/or for at least one user of an access control apparatus information is present on the access authorization proving apparatus, for example address information associated with said user and/or the associated access control apparatus thereof and/or access authorization information for the access control apparatus associated with said user.

The following steps 404-406 are optional and serve for outputting an indication of the possibility of using an access control apparatus (or a compartment controlled by it) for the delivery/collection.

For this purpose, in step 404 a check is made to establish whether, for at least one access control apparatus and/or for at least one user of an access control apparatus, the respective address information (e.g. the routing information or a part thereof) corresponds in accordance with a predefined degree of correspondence to the address information (e.g. the routing code or a part thereof) of the identified shipment data set. Here, too, once again for example only a coordination of the address information of the identified shipment data with the address information of the users (and not of the access control apparatuses) can be performed. The predefined degree of correspondence can require for example that the elements zip code, street and house number of the routing code must correspond to the corresponding entries of the address information (that is to say e.g. of the routing information) of the users.

Figure 5A:
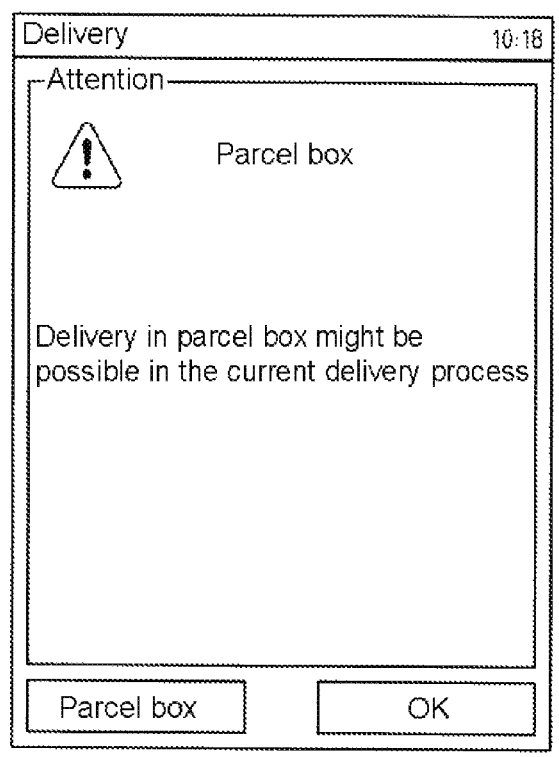
Figure 5B:
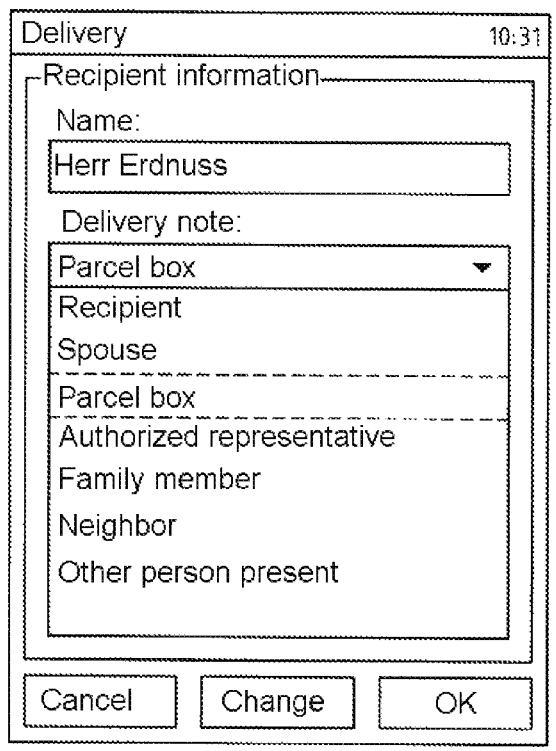

If the check has a positive outcome, in step 405 an indication is output (for example on a graphical user interface of the access authorization proving apparatus 3) that an access control apparatus can be used for the present shipment. Such an indication is illustrated by way of example in FIG. 5*a*, wherein by way of example once again a parcel box was used there as access control apparatus, just like in the further FIGS. 5*b*-5*f* as well, although this should also be understood as general disclosure of an access control apparatus 4. With regard to FIGS. 5*a*-5*f*, it is assumed by way of example that the displays shown there are generated by software on the access authorization proving apparatus 3 and that the access authorization proving apparatus 3 has a touchscreen on which inputs can be performed and buttons can be chosen using a finger or stylus.

In step 406 the deliverer 6 then has the option of bringing about display of the possible access control apparatus(es) as a list or in a detailed view displaying for an access control apparatus the users thereof.

The indication in step 404 thus indicates to the deliverer 6, at an early stage in the delivery/collection process, the possibility that the deliverer can use an access control apparatus 4 for the delivery/collection of the shipment, such that the deliverer can subsequently pursue this delivery/collection option in a targeted manner, for example by selecting a corresponding option on the access authorization proving apparatus 3.

Step 404 can be followed for example by a step in which the deliverer 6 inputs a name of the shipment recipient (as provided on the shipment, for example) or of the customer who ordered the collection of a shipment.

Step 407 involves determining those access control apparatus whose respective address information correspond in accordance with a predefined degree of correspondence to the address information of the identified shipment data set and/or which are respectively associated at least with a respective user whose respective address information correspond in accordance with the predefined degree of correspondence to the address information of the identified shipment data set. Here, too, a coordination can for example once again be based only on the address information of the users and the address information of the identified shipment data set, but not on the address information of the access control apparatuses. The predefined degree of correspondence can require here for example that at least a correspondence vis-à-vis the zip code and the street is present, that is to say that, for example, the respective code constituents representing a zip code and street correspond. This step 407 serves as preparation for the subsequent steps.

In step 408 a check is made to establish whether the number of access control apparatuses determined in step 407 is greater than 0. If this is not the case, step 409 is skipped, otherwise in step 409 an option for using an access control apparatus for the delivery/collection is provided, for example in a menu navigation on the access authorization proving apparatus 3. This is illustrated once again on the basis of the example of a parcel box as access control apparatus 4 in FIG. 5*b*. In the selection field for the "Delivery note", which opens upon activation of the triangle symbol arranged on the right, besides delivery options such as "Recipient", "Spouse", "Family member", "Neighbor", in addition "Parcel box" is present and can be selected by the deliverer 6 and confirmed by "OK". Without the option "Parcel box" in the selection menu, the deliverer 6 has no possibility of transmitting access authorization information to an access control apparatus (e.g. a parcel box). By means of step 408, therefore, a limitation of the use authorization of the access authorization information stored on the access authorization proving apparatus 3 is performed, said limitation being realized by software on the access authorization proving apparatus 3, in order to prevent possible misuse particularly for the case where the access authorization proving apparatus 3 is lost or stolen. Without a shipment (in particular the identification code thereof) assigned to an access control apparatus 4, it is not possible to open an access control apparatus 4, even if access authorization information is present for said access control apparatus 4 on the access authorization proving apparatus 3. This considerably limits the possibilities of misuse of the access authorization proving apparatus 3. In particular, for improper removal of a shipment from an access control apparatus (e.g. a parcel box) using a stolen access authorization proving apparatus, firstly, generally access authorization information for said access control apparatus would have to be present on the stolen access authorization proving apparatus (first hurdle) and, furthermore, the operator of the access authorization proving apparatus would have to know the identification code of the shipment contained in the access control apparatus or know an identification code for a shipment intended for the access control apparatus (second hurdle). The possibilities for misuse are limited even further if the access authorization information has only a limited temporal validity, for example of only one day, and/or the frequency of use of access authorization information at an access control apparatus is limited by a maximum value which is contained in the access authorization information and which is counterchecked by the access control apparatus upon each access attempt.

Step 410 involves interrogating which option was chosen by the deliverer 6. If the option of using the access control apparatus for delivery/collection (that is to say the option "Parcel box" in FIG. 5b) is not involved, different processing is performed in step 411, for example a menu navigation which supports the deliverer in a different delivery/collection option, for example delivery to the actual shipment recipient or to a neighbor of the shipment recipient.

If use of the access control apparatus was chosen as an option, step 412 involves establishing whether the number of access control apparatuses determined in step 407 is equal to 1 or greater than 1.

In the first case, step 413 involves directly displaying the sole determined access control apparatus with its details, in particular its users. This is illustrated once again for a parcel box as an example of an access control apparatus in FIG. 5c. In order to confirm this parcel box, the deliverer 6 has to select the shipment recipient from the list of users and then activate the "OK" button appearing at the bottom right in accordance with FIG. 5d, if the deliverer would like to bring about the communication of access authorization information to said parcel box from the access authorization proving apparatus. This is interrogated in step 413. If no confirmation occurs (for example because the "Back" button is activated instead or because a predefined period of time elapses, the flow diagram 400 jumps back to step 410, where for example a different option can be chosen. However, if the displayed access control apparatus is confirmed, in step 419 the access authorization information associated with the confirmed access control apparatus is communicated to said access control apparatus by the access authorization proving apparatus. This can be performed in particular wirelessly, for example via Bluetooth. In order that the time-consuming Bluetooth pairing can be avoided, in step 401 the access authorization proving apparatus 3 preferably also obtains the Bluetooth Medium-Access Control (MAC) addresses of the access control apparatuses. The latter are for example likewise contained in the respective access control apparatus data sets. The access authorization information associated with the confirmed access control apparatus can be assigned to the access control apparatus for example on the basis of an identifier of the access control apparatus, said identifier being contained in the access authorization information or being associated therewith, and/or is contained together with the address information of the access control apparatus in an access control apparatus data set of the respective access control apparatus.

Figure 5E:
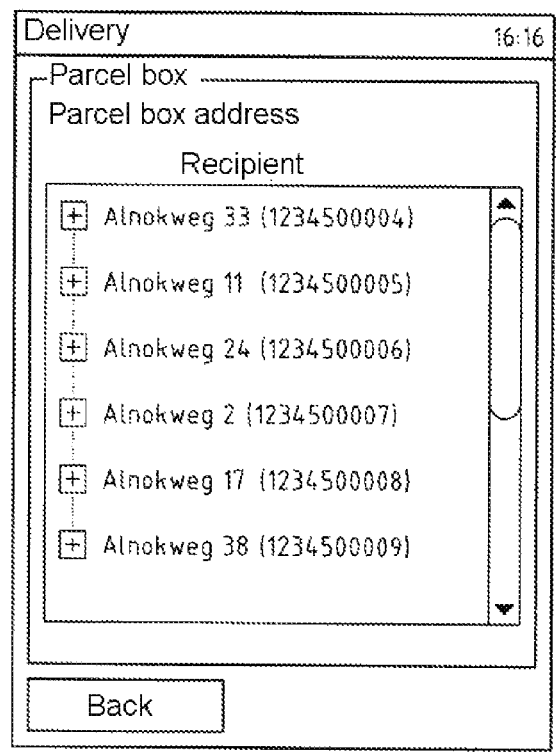
Figure 5F:
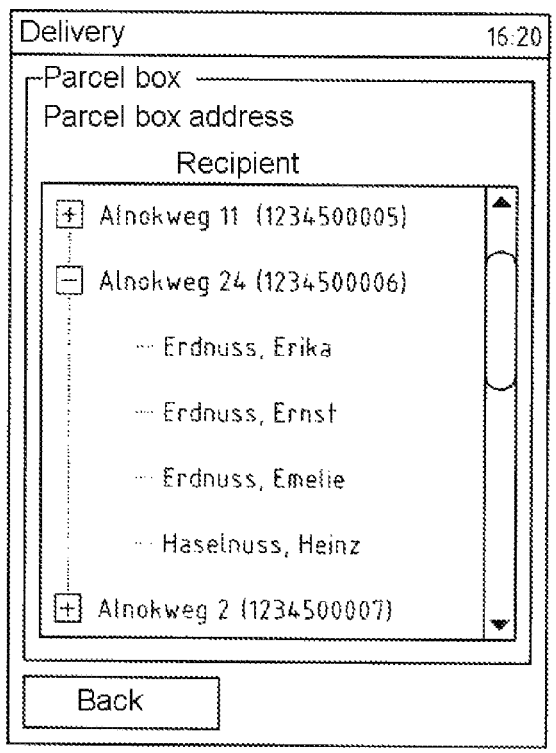

If it is established in step 412 that more than one access control apparatus was determined in step 407, in step 415 a list of the access control apparatuses determined in step 407 is displayed to the deliverer 6 (cf. FIG. 5e). In said list, the deliverer 6, by selecting the "+" symbols, can in each case bring about the display of the users of a respective access control apparatus (here for example: parcel box) (cf. figure Sf) or can select an access control apparatus by tapping on a parcel box (e.g. the address "Alnokweg 24" and/or the ID "1234500006") or the user thereof (e.g. Erdnuss, Ernst). In step 416 a check is made to establish whether such a selection was performed. If this is not the case (e.g. because the "Back" button was activated instead, or because a predefined time without action by the deliverer 6 elapsed), the flow diagram jumps back to step 410. Otherwise, in step 417 details of the access control apparatus are displayed, in a manner similar to that in step 413 (cf. FIG. 5c), and a confirmation of the access control apparatus (if appropriate after prior selection of a user) by activation of the "OK" button is awaited, which is checked in step 418. If no confirmation takes place (e.g. because the "Back" button was activated instead or a predefined period of time has elapsed), the flow diagram 400 jumps back to step 410. Otherwise, in step 419 the access authorization information associated with the confirmed access control apparatus is communicated to said access control apparatus by the access authorization proving apparatus.

It is clearly evident that as a result of the determining in step 407 in combination with steps 413-414 and 415-418, the set of access control apparatuses from which the deliverer 6 has to make a selection if the deliverer wants to obtain access at a concrete access control apparatus is considerably reduced in comparison with an approach in which all access control apparatuses for which information was obtained in step 401 are displayed to the deliverer 6. A further reduction of the selection set is already performed at the provision server 2, as was explained with regard to steps 307 and 310 of the method 300 in FIG. 3. This considerably increases the user friendliness and the speed of the delivery and collection process.

Step 419 can optionally be followed by further steps. By way of example, the deliverer 6 can be asked whether he/she has obtained access to the access control apparatus 4, and/or be reminded, after access has been obtained, to eliminate again the possibility of access for unauthorized persons, for example by the deliverer 6 closing again a door to the compartment which is opened in the course of granting access.

Additionally or alternatively, the flow diagram 400, instead of ending, can jump to step 402 again in order to enable a further delivery/collection process.

As exemplary embodiments of the present invention, the following are further intended to be disclosed:

Exemplary Embodiments 1-23

The embodiments defined in exemplary embodiments 1-23.

Exemplary Embodiment 24

A method (300) comprising:
providing (310) the following pieces of information:
- a plurality of shipment data sets, wherein each of the shipment data sets comprises respective address information of a respective shipment,
- respective pieces of address information associated with access control apparatuses from a plurality of access control apparatus and/or respective pieces of address information associated with one or more respective user(s) of the plurality of access control apparatuses, and
- respective pieces of access authorization information associated with the access control apparatuses from the plurality of access control apparatuses.

Exemplary Embodiment 25

Method according to exemplary embodiment 24, where providing (310) enables an access authorization proving apparatus (3) to perform the following:
- identifying (403) a shipment data set from the provided shipment data sets using information of the shipment (5) obtained at the access authorization proving apparatus (3),
- determining (407) one or more access control apparatus (es) from the plurality of access control apparatuses on the basis of a result of a comparison of the address information of the shipment data set with the provided pieces of address information respectively associated with the access control apparatuses and stored on the access authorization proving apparatus and/or with the provided pieces of address information associated with the respective user(s) of the respective access control apparatus and stored on the access authorization proving apparatus, and
communicating (419) one of the provided pieces of access authorization information which is associated with an access control apparatus (4) from the one or more determined access control apparatus(es), said access control apparatus being selected and/or confirmed by a user (6) of the access authorization proving apparatus (3), to the access control apparatus (4) in order to obtain access to a compartment assigned to the access control apparatus, such that the shipment (5) can be inserted into the compartment or removed therefrom.

Exemplary Embodiment 26

The method according to any of exemplary embodiments 24-25, wherein the provided shipment data sets constitute a selected subset of a larger set of shipment data sets, wherein the provided shipment data sets only comprise shipment data sets of shipments which are assigned to a user of an access authorization proving apparatus in a predefined period.

The method can then for example additionally comprise obtaining the larger set of shipment data sets.

Exemplary Embodiment 27

The method according to any of exemplary embodiments 24-26, wherein the provided respective pieces of address information associated with the access control apparatuses and/or the provided respective pieces of address information associated with one or more respective user(s) of the plurality of access control apparatuses constitute a selected subset of a larger set of pieces of address information, wherein the subset comprises only pieces of address information associated respectively with selected access control apparatuses and/or only pieces of address information associated respectively with one or more user(s) of respective selected access control apparatuses, and wherein the selected access control apparatuses only comprise access control apparatuses for which the respective address information and/or the respective address information of their respective one or more users correspond(s) in accordance with a predefined degree of correspondence to the address information of at least one of the provided shipment data sets.

The method can then for example additionally comprise obtaining the larger set of pieces of address information, that is to say for example a larger set of respective pieces of address information associated with access control apparatuses and/or respective pieces of address information associated with one or more respective user(s) of the plurality of access control apparatuses.

Exemplary Embodiment 28

The method according to exemplary embodiment 27, wherein the provided pieces of access authorization information constitute a selected subset of a larger set of pieces of access authorization information, wherein the provided pieces of access authorization information only comprises pieces of access authorization information of the selected access control apparatuses.

The method can then for example additionally comprise obtaining the larger set of pieces of access authorization information.

Exemplary Embodiment 29

The method according to any of exemplary embodiments 24-28, wherein the provided access authorization information is different for each access control apparatus from the plurality of access control apparatuses.

Exemplary Embodiment 30

The method according to any of exemplary embodiments 25-29, wherein the user of the access authorization proving apparatus is enabled to select the access control apparatus from the one or more determined access control apparatus (es) if more than one access control apparatus was determined.

Exemplary Embodiment 31

The method according to any of exemplary embodiments 25-30, wherein the user of the access authorization proving apparatus is enabled to confirm the access control apparatus from the one or more determined access control apparatus (es) if only the access control apparatus was determined and/or after the access control apparatus was selected from the one or more determined access control apparatus(es) by the user of the access authorization proving apparatus.

Exemplary Embodiment 32

The method according to any of exemplary embodiments 25-31, wherein a number of the one or more determined access control apparatus(es) decreases with an increasing degree of correspondence between the address information of the shipment data set and the pieces of address information respectively associated with the access control apparatuses and/or the users thereof, in particular such that only one access control apparatus is determined if the address information associated with said access control apparatus and/or the user(s) thereof completely corresponds to the address information of the shipment data set.

Exemplary Embodiment 33

The method according to any of exemplary embodiments 25-32, wherein the access authorization proving apparatus is enabled to output an indication of the possibility for using an access control apparatus if the address information of the shipment data set has a predefined degree of correspondence to at least one piece of address information associated with an access control apparatus and/or to at least one piece of address information associated with a user of an access control apparatus.

Exemplary Embodiment 34

The method according to any of exemplary embodiments 25-33, wherein obtaining the information of the shipment comprises wirelessly, in particularly optically, capturing the information of the shipment by means of the access authorization proving apparatus, capturing an input of the information of the shipment by a user of the access authorization proving apparatus by means of a user interface of the access authorization proving apparatus, or selecting or choosing the information of the shipment stored on the access authorization proving apparatus by a user of the access authorization proving apparatus.

Exemplary Embodiment 35

The method according to any of exemplary embodiments 24-34, wherein the access authorization information associated with the respective access control apparatus is contained in a respective access control apparatus data set for the respective access control apparatus.

Exemplary Embodiment 36

The method according to exemplary embodiment 35, wherein the respective access control apparatus data set comprises the address information associated with the respective access control apparatus.

Exemplary Embodiment 37

The method according to any of exemplary embodiments 24-36, wherein a respective piece of address information associated with a respective user of a respective access control apparatus and a respective identifier of the respective access control apparatus are contained in a respective user data set.

Exemplary Embodiment 38

The method according to any of exemplary embodiments 24-37, wherein the same access authorization information associated with an access control apparatus is respectively stored at least on two access authorization proving apparatuses.

Exemplary Embodiment 39

The method according to any of exemplary embodiments 24-38, wherein the access authorization information can only be communicated to the access control apparatus (4) if there is a predefined degree of correspondence between the address information of the shipment data and the address information associated with the access control apparatus and/or the address information associated with a user of the access control apparatus.

Exemplary Embodiment 40

An apparatus configured to perform and/or control the method according to any of exemplary embodiments 24-39 or comprising respective means for performing and/or controlling the steps of the method according to any of exemplary embodiments 24-39.

Exemplary Embodiment 41

A system comprising one or more apparatuses configured to perform and/or control the method according to any of exemplary embodiments 24-39 or means for performing and/or controlling the steps of the method according to any of exemplary embodiments 24-39.

Exemplary Embodiment 42

The system according to exemplary embodiment 41, further comprising an access authorization proving apparatus according to any of exemplary embodiments 1-21.

Exemplary Embodiment 43

A computer program, comprising program instructions that cause a processor to perform and/or control the method according to any of exemplary embodiments 1-21 or 24-39 when the computer program runs on the processor.

The exemplary embodiments of the present invention described by way of example in this specification are intended to be understood as disclosed both individually and in all combinations with one another. In particular, the description of a feature comprised by an embodiment—unless explicitly explained to the contrary—in the present case also ought not be understood to mean that the feature is indispensable or essential for the function of the exemplary embodiment. The sequence of the method steps in the individual flow diagrams as outlined in this specification is not mandatory; alternative sequences of the method steps are conceivable. The method steps can be implemented in various ways; an implementation in software (by program instructions), hardware or a combination of both is thus conceivable for implementing the method steps. Terms used in the patent claims such as "comprise", "have", "include", "contain" and the like do not exclude further elements or steps. The wording "at least partly" includes both the case "partly" and the case "completely". The wording "and/or" is intended to be understood to the effect that the disclosure is intended to include both the alternative and the combination, that is to say "A and/or B" means "(A) or (B) or (A and B)". In the context of this specification, units, persons or the like in the plural mean a plurality of units, persons or the like. The use of the indefinite article does not exclude the plural. An individual device can perform the functions of a plurality of units or devices mentioned in the patent claims. Reference signs indicated in the patent claims should not be regarded as limitations of the means and steps used.

In particular, the present invention is not limited to a specific type of access authorization information; generally it is possible to use any type of access authorization information which can be used to obtain authorization for access vis-à-vis an access control apparatus, in particular by means of codes or keys respectively specific to the access control apparatus.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method performed by an access authorization proving apparatus in a context of collecting or delivering a shipment within a particular delivery area of a delivery company, wherein the access authorization proving apparatus is a portable electronic device, the method comprising:
   storing a plurality of shipment data sets on the access authorization proving apparatus, wherein the plurality of shipment data sets all correspond to the particular delivery area of a plurality of delivery areas of the delivery company,
   obtaining information of a shipment,
   identifying a shipment data set from the plurality of shipment data sets stored on the access authorization proving apparatus using the obtained information of the shipment, wherein the shipment data set comprises first address information associated with the shipment,
   determining at least one access control apparatus from a plurality of access control apparatuses located in the particular delivery area on the basis of a result of a comparison of the first address information of the shipment data set with
   respective second address information associated with the at least one access control apparatus and stored on the access authorization proving apparatus and/or
   respective third address information associated with at least one user of the at least one access control apparatus and stored on the access authorization proving apparatus,
   enabling a selection and/or a confirmation of an access control apparatus from the at least one determined access control apparatus by a user of the access authorization proving apparatus, and
   communicating access authorization information associated with the access control apparatus to the access control apparatus in order to obtain access to a compartment assigned to the access control apparatus, such that the shipment can be inserted into the compartment or removed therefrom.

2. The method as claimed in claim 1, wherein the access authorization proving apparatus stores respectively different access authorization information for each access control apparatus from the plurality of access control apparatuses.

3. The method as claimed in claim 1, wherein the access authorization proving apparatus enables the selection of the access control apparatus from the at least one determined access control apparatus if more than one access control apparatus was determined.

4. The method as claimed in claim 3, wherein the enabling is performed after selection of a menu option by the user of the access authorization proving apparatus which is present if at least one access control apparatus was determined.

5. The method as claimed in claim 1, wherein the access authorization proving apparatus enables the confirmation of the access control apparatus from the at least one determined access control apparatus if the access control apparatus was the only one determined and/or after the access control apparatus was selected by the user of the access authorization proving apparatus from the at least one determined access control apparatus.

6. The method as claimed in claim 1, wherein a number of the at least one determined access control apparatus decreases as a degree of correspondence between the first address information of the shipment data set and pieces of the second address information and/or the third address information increases.

7. The method as claimed in claim 6, wherein only one access control apparatus is determined if the address information associated with this access control apparatus and/or with the at least one user thereof completely corresponds to the first address information of the shipment data set.

8. The method as claimed in claim 1, furthermore comprising:
   outputting an indication of a possibility for using an access control apparatus if the first address information of the shipment data set has a predefined degree of correspondence to at least one piece of the second address information and/or to at least one piece of the third address information.

9. The method as claimed in claim 1, wherein obtaining the information of the shipment comprises wirelessly capturing the information of the shipment by means of the access authorization proving apparatus.

10. The method as claimed in claim 9, wherein the information of the shipment is captured optically.

11. The method as claimed in claim 1, wherein obtaining the information of the shipment comprises selecting or choosing the information of the shipment stored on the access authorization proving apparatus by a user of the access authorization proving apparatus.

12. The method as claimed in claim 1, wherein the shipment data sets comprise only shipment data sets of shipments which are assigned to a user of the access authorization proving apparatus in a predefined period.

13. The method as claimed in claim 1, wherein the second address information stored on the access authorization proving apparatus and/or the third address information stored on the access authorization proving apparatus comprises only respective second address information associated respectively with such access control apparatuses and/or only respective third address information respectively associated with at least one respective user of such access control apparatuses for which the respective address information and/or the respective address information of their at least one respective user corresponds in accordance with a predefined degree of correspondence to the first address information of at least one of the stored shipment data sets.

14. The method as claimed in claim 13, wherein the communicated access authorization information originates from a plurality of pieces of access authorization information stored on the access authorization proving apparatus, wherein these pieces of access authorization information only comprise pieces of access authorization information from those access control apparatuses for which the respective second address information and/or the respective third address information corresponds in accordance with a predefined degree of correspondence to the first address information of at least one of the stored shipment data sets.

15. The method as claimed in claim 1, wherein the access authorization information associated with the respective access control apparatus is contained in a respective access control apparatus data set for the respective access control apparatus.

16. The method as claimed in claim 15, wherein the respective access control apparatus data set comprises the address information associated with the respective access control apparatus.

17. The method as claimed in claim 1, wherein the same access authorization information associated with an access control apparatus is respectively stored on at least two access authorization proving apparatuses.

18. The method as claimed in claim 1, wherein the access authorization information can only be communicated to the access control apparatus if there is a predefined degree of correspondence between the first address information of the shipment data and the second address information associated with the access control apparatus and/or the third address information associated with the at least one user of the access control apparatus.

19. The method as claimed in claim 1, wherein the identified shipment data set indicates that the shipment is generally permitted to be inserted into or removed from a compartment assigned to an access control apparatus prior to at least one of
   the determining of the at least one access control apparatus,
   the enabling of a selection and/or a confirmation of an access control apparatus of the at least one determined access control apparatus or
   the communicating of access authorization information associated with the confirmed and/or selected access control apparatus.

20. The method as claimed in claim 1, wherein obtaining the information of the shipment comprises capturing an input of the information of the shipment by a user of the access authorization proving apparatus by means of a user interface of the access authorization proving apparatus.

21. An access authorization proving apparatus comprising at least one processor and at least one memory that includes program code, wherein the memory and the program code are configured to cause the access authorization proving apparatus to perform and/or control at least the following in a context of collecting or delivering a shipment within a particular delivery area of a delivery company, wherein the access authorization proving apparatus is a portable electronic device:
   storing a plurality of shipment data sets on the access authorization proving apparatus, wherein the plurality of shipment data sets all correspond to the particular delivery area of a plurality of delivery areas of the delivery company,
   obtaining information of a shipment,
   identifying a shipment data set from the plurality of shipment data sets stored on the access authorization proving apparatus using the obtained information of the shipment, wherein the shipment data set comprises first address information associated with the shipment,
   determining at least one access control apparatus from a plurality of access control apparatuses located in the particular delivery area on the basis of a result of a comparison of the first address information of the shipment data set with
      respective second address information associated with the at least one access control apparatus and stored on the access authorization proving apparatus and/or
      respective third address information associated with at least one user of the at least one access control apparatus and stored on the access authorization proving apparatus,
   enabling a selection and/or a confirmation of an access control apparatus from the at least one determined access control apparatus by a user of the access authorization proving apparatus, and
   communicating access authorization information associated with the access control apparatus to the access control apparatus in order to obtain access to a compartment assigned to the access control apparatus, such that the shipment can be inserted into the compartment or removed therefrom.

22. The access authorization proving apparatus as claimed in claim 21, wherein the access authorization proving apparatus stores respectively different access authorization information for each access control apparatus from the plurality of access control apparatuses.

23. The access authorization proving apparatus as claimed in claim 21, wherein the access authorization proving apparatus enables the selection of the access control apparatus from the at least one determined access control apparatus if more than one access control apparatus was determined.

24. The access authorization proving apparatus as claimed in claim 23, wherein the enabling is performed after selection of a menu option by the user of the access authorization proving apparatus which is present if at least one access control apparatus was determined.

25. The access authorization proving apparatus as claimed in claim 21, wherein the access authorization proving apparatus enables the confirmation of the access control apparatus from the at least one determined access control apparatus if the access control apparatus was the only one determined and/or after the access control apparatus was selected by the user of the access authorization proving apparatus from the at least one determined access control apparatus.

26. The access authorization proving apparatus as claimed in claim 21, wherein a number of the at least one determined access control apparatus decreases as a degree of correspondence between the first address information of the shipment data set and pieces of the second address information and/or the third address information increases.

27. The access authorization proving apparatus as claimed in claim 26, wherein only one access control apparatus is determined if the address information associated with this access control apparatus and/or with the at least one user thereof completely corresponds to the first address information of the shipment data set.

28. The access authorization proving apparatus as claimed in claim 21, wherein the memory and the program code are configured to further cause the access authorization proving apparatus to perform and/or control:
  outputting an indication of a possibility for using an access control apparatus if the first address information of the shipment data set has a predefined degree of correspondence to at least one piece of the second address information and/or to at least one piece of the third address information.

29. The access authorization proving apparatus as claimed in claim 21, wherein obtaining the information of the shipment comprises wirelessly capturing the information of the shipment by means of the access authorization proving apparatus.

30. The access authorization proving apparatus as claimed in claim 29, wherein the information of the shipment is captured optically.

31. The access authorization proving apparatus as claimed in claim 21, wherein obtaining the information of the shipment comprises selecting or choosing the information of the shipment stored on the access authorization proving apparatus by a user of the access authorization proving apparatus.

32. The access authorization proving apparatus as claimed in claim 21, wherein the shipment data sets comprise only shipment data sets of shipments which are assigned to a user of the access authorization proving apparatus in a predefined period.

33. The access authorization proving apparatus as claimed in claim 21, wherein the second address information stored on the access authorization proving apparatus and/or the third address information stored on the access authorization proving apparatus comprises only respective second address information associated respectively with such access control apparatuses and/or only respective third address information respectively associated with at least one respective user of such access control apparatuses for which the respective address information and/or the respective address information of their at least one respective user corresponds in accordance with a predefined degree of correspondence to the first address information of at least one of the stored shipment data sets.

34. The access authorization proving apparatus as claimed in claim 33, wherein the communicated access authorization information originates from a plurality of pieces of access authorization information stored on the access authorization proving apparatus, wherein these pieces of access authorization information only comprise pieces of access authorization information from those access control apparatuses for which the respective second address information and/or the respective third address information corresponds in accordance with a predefined degree of correspondence to the first address information of at least one of the stored shipment data sets.

35. The access authorization proving apparatus as claimed in claim 21, wherein the access authorization information associated with the respective access control apparatus is contained in a respective access control apparatus data set for the respective access control apparatus.

36. The access authorization proving apparatus as claimed in claim 35, wherein the respective access control apparatus data set comprises the address information associated with the respective access control apparatus.

37. The access authorization proving apparatus as claimed in claim 21, wherein the same access authorization information associated with an access control apparatus is respectively stored on at least two access authorization proving apparatuses.

38. The access authorization proving apparatus as claimed in claim 21, wherein the access authorization information can only be communicated to the access control apparatus if there is a predefined degree of correspondence between the first address information of the shipment data and the second address information associated with the access control apparatus and/or the third address information associated with the at least one user of the access control apparatus.

39. The access authorization proving apparatus as claimed in claim 21, wherein the identified shipment data set indicates that the shipment is generally permitted to be inserted into or removed from a compartment assigned to an access control apparatus prior to at least one of
  the determining of the at least one access control apparatus,
  the enabling of a selection and/or a confirmation of an access control apparatus of the at least one determined access control apparatus or
  the communicating of access authorization information associated with the confirmed and/or selected access control apparatus.

40. The access authorization proving apparatus as claimed in claim 21, wherein obtaining the information of the shipment comprises capturing an input of the information of the shipment by a user of the access authorization proving apparatus by means of a user interface of the access authorization proving apparatus.

* * * * *